United States Patent
Slick et al.

(10) Patent No.: US 7,111,322 B2
(45) Date of Patent: Sep. 19, 2006

(54) AUTOMATIC GENERATION OF A NEW ENCRYPTION KEY

(75) Inventors: Royce E. Slick, Mission Viejo, CA (US); Joseph Yang, Cypress, CA (US); William Zhang, Irvine, CA (US)

(73) Assignee: Canon Kabushiki Kaisha, Tokyo (JP)

(*) Notice: Subject to any disclaimer, the term of this patent is extended or adjusted under 35 U.S.C. 154(b) by 853 days.

(21) Appl. No.: 10/309,896

(22) Filed: Dec. 5, 2002

(65) Prior Publication Data

US 2004/0109568 A1    Jun. 10, 2004

(51) Int. Cl.
    *G06F 4/00*    (2006.01)
(52) U.S. Cl. .............................. 726/5; 726/19; 726/22; 726/30
(58) Field of Classification Search ................. 726/19, 726/5, 18, 17, 10, 8, 65, 27, 26, 22
    See application file for complete search history.

(56) References Cited

U.S. PATENT DOCUMENTS

| | | | | |
|---|---|---|---|---|
| 4,926,475 A | | 5/1990 | Spiotta et al. .................. 380/2 |
| 5,164,988 A | * | 11/1992 | Matyas et al. .............. 713/156 |
| 5,208,853 A | | 5/1993 | Armbruster et al. ........... 380/4 |
| 5,214,702 A | * | 5/1993 | Fischer ......................... 380/30 |
| 5,341,425 A | | 8/1994 | Wasilewski et al. .......... 380/20 |
| 5,442,703 A | | 8/1995 | Kim et al. ..................... 380/21 |
| 5,450,493 A | * | 9/1995 | Maher .......................... 380/30 |
| 5,638,442 A | | 6/1997 | Gargiulo et al. ................ 380/2 |
| 5,680,458 A | * | 10/1997 | Spelman et al. ............. 380/277 |
| 5,841,864 A | | 11/1998 | Klayman et al. ............. 380/21 |
| 5,850,450 A | | 12/1998 | Schweitzer et al. ........... 380/30 |
| 6,058,188 A | * | 5/2000 | Chandersekaran et al. .. 380/286 |
| 6,094,487 A | | 7/2000 | Butler et al. ................. 380/270 |
| 6,298,360 B1 | | 10/2001 | Muller ....................... 708/250 |
| 6,314,521 B1 | * | 11/2001 | Debry .......................... 726/10 |
| 6,317,499 B1 | | 11/2001 | Hillyer et al. ................ 380/59 |
| 6,343,361 B1 | | 1/2002 | Nendell et al. ............. 713/171 |
| 6,378,070 B1 | | 4/2002 | Chan et al. .................. 713/155 |
| 6,385,728 B1 | | 5/2002 | DeBry ......................... 713/201 |
| 6,389,535 B1 | | 5/2002 | Thomlinson et al. ....... 713/165 |
| 6,393,127 B1 | | 5/2002 | Vogler ......................... 380/283 |
| 6,430,170 B1 | | 8/2002 | Saints et al. ................ 370/335 |
| 6,430,690 B1 | | 8/2002 | Vanstone et al. ........... 713/182 |

(Continued)

FOREIGN PATENT DOCUMENTS

WO    01/93013    12/2001

*Primary Examiner*—Norman M. Wright
(74) *Attorney, Agent, or Firm*—Fitzpatrick, Cella, Harper & Scinto

(57) ABSTRACT

A device (such as a printer or a network device that may be connected to the printer) that is connected to a network and which performs secure operations using an existing encryption keypair maintained within the device, generates a new encryption keypair within the device by receiving a request from another device on the network to provide an encryption key of the existing encryption keypair to the another device. In response to the request, the device determines whether an encryption key of the existing encryption keypair within the device is valid. In a case where it is determined that the encryption key of the existing encryption keypair is invalid, the device automatically deletes each key of the existing encryption keypair from the device, generates a new encryption keypair within the device and stores the new encryption keypair in the device. The device then provides a new encryption key corresponding to the requested encryption key of the new encryption keypair to another device.

78 Claims, 19 Drawing Sheets

U.S. PATENT DOCUMENTS

| | | |
|---|---|---|
| 6,466,921 B1 | 10/2002 | Cordery et al. ............... 705/60 |
| 6,792,541 B1 | 9/2004 | Kusakabe et al. .......... 713/200 |
| 2002/0131592 A1 | 9/2002 | Hinnant ....................... 380/46 |
| 2003/0081788 A1 | 5/2003 | Simpson et al. ............ 380/278 |
| 2003/0088772 A1* | 5/2003 | Gehrmann et al. ......... 713/175 |
| 2003/0236993 A1 | 12/2003 | McCreight et al. ......... 713/200 |
| 2004/0062400 A1* | 4/2004 | Sovio et al. ................. 380/286 |

* cited by examiner

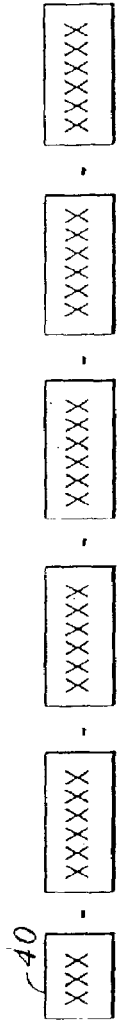

```
typedef struct tag_PublicKeyResponse {

// Header
    unsigned long      dwPublicKeyHeaderTag;    // "KEY"
    unsigned short     wVersion;
    unsigned short     wCompatibilityMask;
    unsigned short     wKeyType;
    unsigned short     wFlags;
    unsigned long      dwTotalResponseLen;
    unsigned long      dwHeaderLen // Public Exponent
    unsigned long      dwPublicExponentTag;     // "EXP"
    unsigned long      dwPublicExponentLen;
    char *             pPublicExponentData;

// Modulus
    unsigned long      dwModulusTag;            // "MOD"
    unsigned long      dwModulusLen;
    char *             pModulusData;

// Terminator
    unsigned long      dwTerminator;            // "EOF"

Lead-In 510

| 501 | 502 | 503 | 504 | 511 | 512 | 513 | 514 | 515 | 516 |
|---|---|---|---|---|---|---|---|---|---|
| 43x 'C' | 53x 'S' | 50x 'P' | 00x NULL | Version | Compatibility Mask | Total Header Length | Lead-In Length | OPTION MASK | Payload Data Length (optional) |
| 8 bits | 8 bits | 8 bits | 8 bits | 16 bits | 16 bits | 32 bits | 32 bits | 32 bits | 32 bits |

FIG. 10A

Public Header 520

| 521 | 522 | 523 | 524 | 525 | 526a | 526b | 527a | 527b | 528a | 528b | 529a | 529b |
|---|---|---|---|---|---|---|---|---|---|---|---|---|
| 50x 'P' | 55x 'U' | 42x 'B' | 00x NULL | Public Header Length | Public Key Algorithm | Public Key Length | Symmetric Algorithm | Symmetric Key Length | Signature Algorithm | Signature Key Length | Hash Algorithm | Hash Key Length |
| 8 bits | 8 bits | 8 bits | 8 bits | 32 bits | 16 bits | 16 bits | 16 bits | 16 bits | 16 bits | 16 bits | 16 bits | 16 bits |

FIG. 10B

Private Header 530

| 532 | 533 | 534 | 535 | 536 | 537 |
|---|---|---|---|---|---|
| 50x 'P' | 52x 'R' | 56x 'V' | 00x NULL | Private Header Length | $E_{PK}$[Symmetric Key + Hash (HMAC) Key] |
| 8 bits | 8 bits | 8 bits | 8 bits | 32 bits | n bit (where n = the number of bits in the RSA modulus) |

FIG. 10C

| Bit Position | | Meaning |
|---|---|---|
| Bit 0 | Recipient ID Encrypted: | A "1" in this bit field indicates that the *Recipient ID Length* and *recipient ID* fields in the Routing Header are encrypted, using the enclosed symmetric Key. A "0" in this field indicates that the *Recipient ID Length* and *Recipient ID* are cleartext. |
| Bit 1 | Sender ID Encrypted: | A "1" in this bit field indicates that the *Sender ID Length* and *Sender ID* fields in the Routing Header are encrypted, using the enclosed symmetric Key. A "0" in this field indicates that the *Sender ID Length* and *Sender ID* are cleartext. |
| Bit 2 | Payload Data Length Present: | A "1" in this bit field indicates that the *payload Data Length* field in the Lead-In contains the total length of the Data Payload. A "0" in this field indicates that the total length of the Payload Data is not specified. If the Length of the Payload Data is not specified, the *Payload Data Length* field must be set to zero. |
| Bit 3–Bit 31 | | Reserved – All unused bits must be set to "0" |

FIG. 11

| Contents | Public Key Algorithm |
|---|---|
| 0000$_x$ | None |
| 0001$_x$ | RSA, using PKCS#1, version 1.5, block type2 |
| 0002$_x$–FFFF$_x$ | *Invalid* |

FIG. 12

| Contents | Public Key Length |
|---|---|
| 0000$_x$ | *Invalid* |
| 0200$_x$ | 512 bits |
| 0300$_x$ | 768 bits |
| 0400$_x$ | 1024 bits (Preferred) |
| 0800$_x$ | 2048 bits |
| All others | *Support is optional* |

FIG. 13

| Contents | Symmetric Key Algorithm |
|---|---|
| $0000_x$ | None |
| $0001_x$ | RC4 |
| $0002_x - FFFF_x$ | others |

FIG. 14

| Contents | Symmetric Key Length |
|---|---|
| $0028_x$ | 40 bits |
| $0080_x$ | 128 bits (preferred) |
| All others | Support is optional |

FIG. 15

| Contents | Signature Algorithm |
|---|---|
| $0000_x$ | None |
| All others | others |

FIG. 16

| Contents | Signature Key Length |
|---|---|
| 0000ₓ | None |
| All others | others |

FIG. 17

| Contents | Hash Algorithm |
|---|---|
| 0000ₓ | None |
| 0001ₓ | HMAC w/SHA-1 (160 bits) |
| 0002ₓ-FFFFₓ | others |

FIG. 18

| Contents | Hash Key Length |
|---|---|
| 0000ₓ | None |
| 0080ₓ | 128 bits |
| All others | others |

FIG. 19

| 0031x '1' | 0032x '2' | 0033x '3' | 0034x '4' | 0000x NUL | 0000x NUL |
|---|---|---|---|---|---|
| 16 bits | 16 bits | 16 bits | 16 bits | 16 bits | 16 bits |
| 32 bits | | 32 bits | | 32 bits | |

FIG. 20

| 0048x 'H' | 0065x 'e' | 006Cx 'l' | 006Cx 'l' | 006Fx 'o' | 0020x ' ' | 0057x 'W' | 006Fx 'o' | 0072x 'r' | 006Cx 'l' | 0064x 'd' | 0000x NUL |
|---|---|---|---|---|---|---|---|---|---|---|---|
| 16 bits | 16 bits | 16 bits | 16 bits | 16 bits | 16 bits | 16 bits | 16 bits | 16 bits | 16 bits | 16 bits | 16 bits |
| 32 bits | | 32 bits | | 32 bits | | 32 bits | | 32 bits | | 32 bits | |

FIG. 21

AUTOMATIC GENERATION OF A NEW ENCRYPTION KEY

INCORPORATION BY REFERENCE

U.S. patent application Ser. No. 10/010,974, filed on Dec. 5, 2001, entitled "Secure Printing With Authenticated Printer Key" is hereby incorporated by reference as if set forth in full herein.

BACKGROUND OF THE INVENTION

1. Field of the Invention

The present invention concerns automatic generation of a new encryption keys when existing keys are found to be corrupt. More particularly, the present invention concerns a device determining whether an existing encryption keypair is valid, and if not, automatically deleting the existing encryption keypair from the device, generating a new encryption keypair within the device itself, and notifying another device on a network that a new encryption keypair has been generated.

2. Description of the Related Art

The use of encryption keys for secure network printing applications is known. For example, it has been known to use public/private keypairs for secure printing. With this technique, a public/private keypair for the printer is generally created during the manufacturing process of the printer. The private key is generally maintained within the printer and is not divulged outside of the printer. The public key, on the other hand, is both maintained within the printer and is made available to the general public for use in transmitting secure print jobs to the printer. The printer's public key can be provided to users via any of a number of means including a public key infrastructure (PKI) or by a printer driver simply requesting the public key from the printer itself or from a secure print server. Once the printer's public key has been obtained, a printer driver uses the public key to encrypt a symmetric key, which is used to encrypt print data and transmits the encrypted print job to the printer. Upon receiving the encrypted print job, the printer uses its private key of the public/private keypair to decrypt the public key and to obtain the symmetric key, which the printer then uses to decrypt the print data.

While this system has worked somewhat well, problems arise when the printer's public and/or private keys have become corrupt. In a case where the printer's public key has become corrupt in the printer, the printer will no longer be able to provide the public key to additional clients. While clients already in possession of the printer's original public key will still be able to use it to encrypt future jobs, which the printer will be able to successfully decrypt, no additional clients will be able to obtain the key and thus encrypt print jobs directed to this printer. In a case where the printer's private key has become corrupt, the printer driver may not be aware that the key is corrupt and may send a print job to the printer using the printer's public key, which is associated with the corrupt private key. In this case, the printer will be unable to decrypt the print job using the corrupt private key and as a result, the print job generally fails.

It is also possible that the printer's public key, after having been obtained by a client and stored locally in the client, may become corrupt in the client. To address the concern, it has been proposed to validate the locally stored public key in the client before submitting the print job to the printer. In this case, the printer driver in the client retrieves the locally stored public key and performs a validation (integrity) check on the public key by performing a hashing algorithm over the key and comparing the resultant hash value with a hash value of the key that was generated and stored locally in the client when the key was first created. If the printer driver is unable to validate the printer's public key, the print job is terminated by the printer driver and the user is notified of a printing error. As a result, the printer driver cannot process secure print jobs.

However, in the case where either the printer's public or private key becomes corrupt in the printer, it is generally assumed that a hardware failure has occurred within the printer and that the security hardware needs to be replaced. Of course, it may also be possible for an administrator to correct the problem by installing a new keypair in the printer rather than replacing the hardware, and notifying the public that the printer's public key has changed. However, both of the foregoing correction processes involve relatively significant printer downtime to either replace the printer's hardware or to install new keys. Thus, the printer is unusable, particularly for printing secure print jobs, until the error can be corrected.

SUMMARY OF THE INVENTION

The present invention addresses the foregoing by determining if an existing key in a device is valid, and if not, automatically generating a new encryption keypair within the device itself. According to the invention, the device (which will hereinafter be referred to as a "printer") receives a request from, for example, a host computer for an encryption key of an existing encryption keypair, and in response, determines whether the requested encryption key is valid. The determination preferably comprises running a hashing algorithm on the requested encryption key and comparing the result to a stored hash value. It may also be preferable to validate the corresponding key of the existing keypair as well. If it is determined that the requested key of the existing keypair is invalid (i.e., has been corrupted), the printer automatically deletes each key of the existing encryption keypair and generates a new encryption keypair within the printer itself. Then, the printer transmits the new encryption key to the host computer. Thus, the host computer can then validate the new key and use it for submitting an encrypted print job to the printer. It should be noted that while the device has been referred to above as a "printer", the device may be a stand alone network device instead that provides encryption functionality to a printer.

As a result of the foregoing, rather than assuming that a hardware failure has occurred in the device and replacing the hardware, new encryption keys are generated instead so as to attempt to salvage the hardware. However, if too many failures occur within a specified time, then it may be assumed that a hardware failure has actually occurred and further attempts to generate new encryption keys may not be performed. Additionally, since new encryption keys are automatically generated rather quickly and within the device itself, there is no need to wait for an administrator to install new keys and the device can remain online for processing encrypted jobs with little downtime.

Thus, in one aspect, the invention generates a new encryption keypair within a device that is connected to a network and which performs secure operations using an existing encryption keypair maintained within the device by receiving a request from another device on the network to provide an encryption key of the existing encryption keypair to the another device, and in response to the request, determining whether an encryption key of the existing encryption keypair within the device is valid. In a case where it is determined that the encryption key of the existing encryption keypair is invalid, the device automatically deletes each key of the existing encryption keypair from the device, generates a new encryption keypair within the device and stores the new encryption keypair in the device, and provides a new encryption key corresponding to the requested encryption key of the new encryption keypair to the another device.

The determination may comprise performing an integrity check on the requested encryption key. Moreover, the determination may be performed on each key of the existing encryption keypair, rather than merely the requested key. In this manner, the integrity of both keys can be determined and successful printing of a secure print job can be more readily assured.

The device maintaining the encryption keys and which generates the new encryption keypair may be a printer, and the another device may be a host computer. The request for the existing encryption key may be issued by the printer driver in the host computer to printer. When the host computer receives the new encryption key from the printer, the host computer may perform an operation to validate the new encryption key. The validation operation may comprise issuing a request for the printer to print out a key validation page for the new encryption key, a user inputting into the host computer a key validation code printed on the key validation page, and the host computer validating the new encryption key utilizing the input key validation code. Alternatively, the new encryption key may be validated utilizing a public key infrastructure.

In generating the new encryption keypair, the request issued by the host computer preferably includes random data generated within the host computer as a source of entropy for encryption key generation. The printer generates the new encryption keypair utilizing, as sources of entropy for the new encryption keypair generation, the random data included with the request and random data generated within the device itself.

In another aspect, the invention prints a secure print job by a host apparatus submitting a request to a network device for the network device to provide the host apparatus with an existing encryption key of a printer. The network device, in response to receiving the request, determines whether the requested encryption key of the existing encryption keypair of the printer is valid. In a case where the requested existing encryption key is determined to be invalid, the network device automatically deletes the existing encryption keypair from the network device, generates a new encryption keypair within the network device, stores the new encryption keypair in the network device, and transmits a new encryption key corresponding to the requested encryption key of the new encryption keypair to the host apparatus. The host apparatus receives the new encryption key from the network device, and in response thereto, performs an operation to validate the new encryption key. The host apparatus then generates an encrypted print job utilizing the new encryption key and transmits the encrypted print job to the network device. The network device utilizes a corresponding encryption key of the new encryption keypair to decrypt the encrypted print job, and processes the decrypted print job for printout by the printer.

Thus, with this aspect, each time a user selects an option to submit a secure print job to a printer, the printer's public key is validated in the printer before being submitted to the printer driver. If the key is determined to be invalid, the printer merely generates a new encryption keypair and transmits the new encryption key to the printer driver. As a result, although the encryption key may be corrupt, an uninterrupted secure printing job can be obtained since the new key generation process is relatively seamless.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 3A depicts a format for a validation code used to validate a printer's public key.

FIG. 3B is a table of algorithm designators.

FIG. 4 depicts a format of request messages used in conjunction with the invention.

FIGS. 5A and 5B depict examples of a public key request message, and a key validation request message, respectively.

FIG. 6 depicts cleartext for a public key response.

FIG. 10A is block format for a Lead-In portion of a secure client header.

FIG. 10B is a block format for a Public Header portion of a secure client header.

FIG. 10C is a block format for a Private Header portion of a secure client header.

FIG. 11 is a table of values for an Option Mask portion of the Lead-In. FIG. 12 is a table of values for a Public Key Algorithm of the Public Header.

FIG. 13 is a table of values for a Public Key Length of the Public Header.

FIG. 14 is a table of values for a Symmetric Key Algorithm portion of the Public Header.

FIG. 15 is a table of values for a Symmetric Key Length portion of the Public Header.

FIG. 16 is a table of values for a Signature Algorithm portion of the Public Header.

FIG. 17 is a table of values for a Signature Key Length portion of the Public Header.

FIG. 18 is a table of values of a Hashing Algorithm portion of the Public Header.

FIG. 19 is a table of values for a Hash Key Length portion of the Public Header.

FIG. 20 is a block format of a numeric PIN.

FIG. 21 is a block format of an alphanumeric PIN.

DETAILED DESCRIPTION OF THE PREFERRED EMBODIMENTS

The following description will be made with regard to a secure printing system in which print jobs are processed by a printer using a public/private keypair of the printer. Thus, while the focus of the following description will be made with regard to a secure printing system, the invention is not limited to such and can be employed in other environments where encryption keys are generated and utilized.

Figure 1:
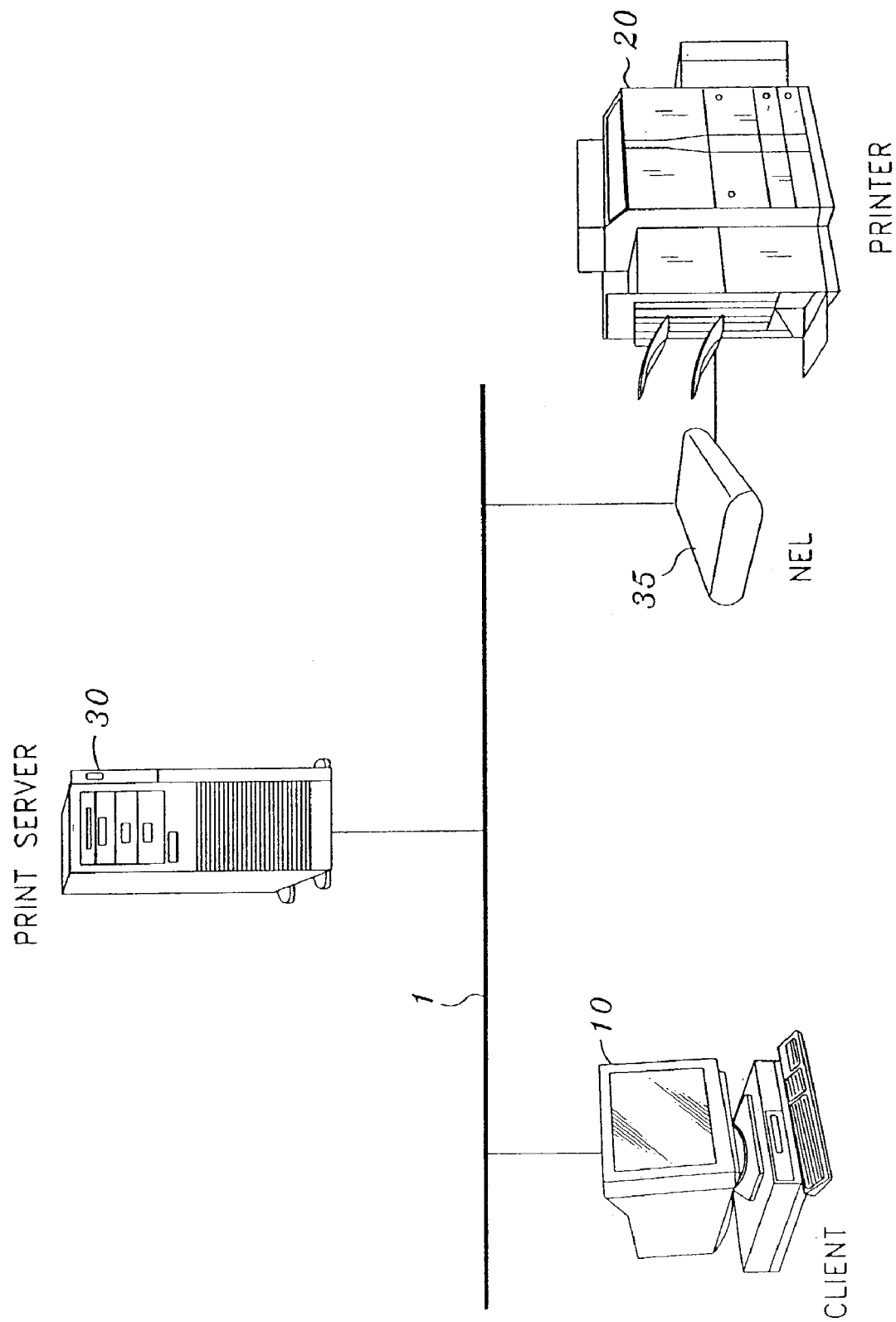
FIG. 1 depicts a hardware overview for an environment in which the invention may be implemented.

FIG. 1 provides a system view of a computing environment in which the present invention may be implemented. As shown in FIG. 1, the computing environment comprises client computer 10, printer 20, print server 30, NEL device 35 and connection 1. Connection 1 can be a simple local connection between computer 10 and printer 20, such as a serial, USB, firewire, or other such, connection. As an alternative, connection 1 may be a network, such as an Ethernet network medium consisting of a bus-type physical architecture. It should be appreciated that connection 1 may also be comprised of another type of network, including the Internet.

Client computer 10 is preferably a personal computer or workstation having a windowing operating system environment such as Microsoft Windows 2000 or Microsoft Windows NT, although other operating systems may also be used. As is typical with PC-type computers, client computer 10 preferably has a display (monitor), keyboard, and a mouse or other type of pointing device so that a user can operate the computer to perform various operations, including submission of a print job to a printer or print server.

Printer 20 communicates with client computer 10 via connection 1 and is preferably a laser or an ink-jet printer which is capable of printing images on a recording medium based on received print data. Preferably, printer 20 is a Canon ImageRunner 5000 (iR5000) printer. Printer 20 may also have a fixed storage medium, which is preferably a fixed disk, but can be a computer memory such as ROM or EEPROM. Printer 20 also includes a connection with NEL 35 such that printer 20 and NEL 35 can communicate with one another. While NEL 35 is shown as being an external stand-alone device, NEL 35 may be incorporated within printer 20 instead, thus forming an embedded device within the printer.

Server 30 may also be connected to connection 1 and is preferably a print server. It should be noted that server 30 is not a necessary component needed for practicing the invention and is merely depicted for a more thorough description. Server 30 preferably comprises a PC-compatible computer having a windowing operating system environment such as Microsoft 2000 server or Microsoft NT server. Of course, server 30 could be any other type of server running other server-type operating systems such as Novell, Unix, Sun Microsystems, etc. Server 30 preferably has a fixed disk which is preferably a large fixed disk for storing numerous files, applications and data. Server 30 can therefore be utilized by other devices on connection 1, such as client computer 10, as a file server or other type of server, such as a print server. Server 30 may also act as a gateway for other devices on connection 1 to access another network such as the Internet.

Also shown in FIG. 1 is NEL device 35. NEL stands for "Net Extend Lite" and the device, although shown as being an external device connected to printer 20, could be embedded within printer 20 instead. Thus, throughout the course of the following description, reference to an "embedded device" refers to the NEL in general. NEL device 35 provides functionality for printer 20 to process encrypted print jobs, as well as other functionalities that are beyond the realm of the present application. With regard to encryption functionality, NEL device 35 includes a mechanism to accumulate entropy (i.e., random data associated with the NEL and printer 20) for use in generating encryption keys, algorithms for generating the encryption keys and decrypting the encryption keys, as well as for validating the encryption keys, etc. The process of generating encryption keys within the NEL itself comprises the present invention and a more detailed description of this process will be provided for below. Thus, NEL device 35 provides the ability for printer 20 to receive and process encrypted print jobs.

Utilizing the computing environment shown in FIG. 1, a user at computer 10 can submit a print job to printer 20 (optionally, via print server 30) using a Windows application. Upon selecting a print option in the Windows application, a print dialog appears and the user can select an option for submitting a secure print job to the printer. Briefly stated, this process comprises the printer driver rendering print data for the print job in a printer definition language, encrypting the rendered print data, packaging the encrypted print data in the secure file format, and sending the print job to the printer for printing. Part of the process of packaging the print job involves obtaining and validating encryption keys and this process has been described by the inventors herein in co-pending U.S. patent application Ser. No. 10/010,974, filed on Dec. 5, 2001, entitled "Secure Printing With Authenticated Printer Key", the contents which are hereby incorporated by reference as if set forth in full herein. The secure print job, having been submitted to the printer, is received by the NEL, whereby the NEL decrypts the print job and passes cleartext of the print job to the printer for printout.

Figure 2:
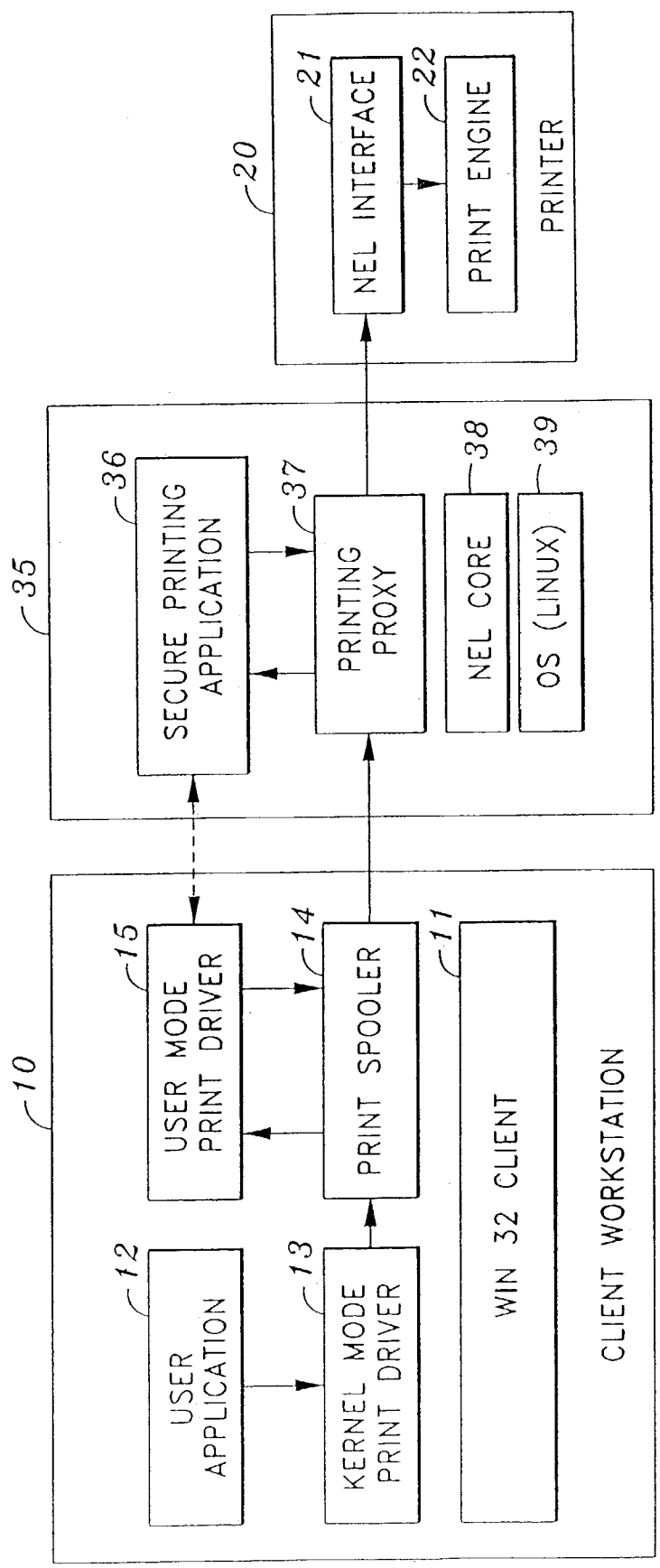
FIG. 2 depicts a block diagram of software components utilized in practicing the invention.

FIG. 2 provides an overview of various software components utilized in practicing the invention. The components depicted in FIG. 2 relate to the use of a Windows operating system, but it can be appreciated that the invention can be implemented in any of various other environments instead and therefore, the invention is not limited to use with the Windows software components depicted in FIG. 2. As seen in FIG. 2, client workstation 10, which as described above, is preferably a PC-compatible workstation running a Windows operating system, includes Win 32 client 11, kernel mode print driver 13 and print spooler 14. Also included within client workstation 10 is at least one user application 12, which may be, for example, a word processing application such as Microsoft Word or Corel WordPerfect, a graphics application such as Microsoft Powerpoint, MGI Photosuite, etc., or any other type of application program for which a print job can be submitted for printing. As is well known in the art, the application program is installed by a user and is preferably stored in a hard disk (not shown) of client workstation 10.

Client workstation 10 is also seen to include User Mode Print Driver 15, which for the present invention, is preferably a Canon secure printer driver installed in client workstation 10 for a Canon printer, such as an ImageRunner 5000 series printer. That is, the client-resident portion of a secure printing software is preferably implemented in the printer driver, using a Common Core Driver (CCD) architecture with Secure Print specific features being implemented in an associated user-mode printer driver. A secure file format for packaging the secure print job is preferably generated by User Mode Print Driver 15 and the details of such will be provided below.

The client software also preferably uses a Windows Cryptographic Application Programming Interface (CAPI), where possible. CAPI is a product available with Microsoft Windows operating systems. Note that differences exist between the availability of certain CAPI features among the different Windows operating systems and therefore, the client software should be implemented such that compatibility is ensured on all targeted OS platforms. The cryptographic algorithms and functions utilized on the Windows client are preferably RC4 ("Ron's Code #4" for symmetric key encryption/decryption), RSA ("Rivest, Shamir and Adelman", an asymmetric public key encryption algorithm), using PKCS #1 (Public Key Cryptography Standard) version 1.5 (asymmetric key encryption/decryption; digital signatures/verification), HMAC (Hashing Message Authentication Code), SHA-1 (Secure Hash Algorithm), and a Random Data Source (for generation of symmetric keys).

NEL 35 is seen to include operating system (OS) 39 and NEL Core software 38, which provide NEL 35 with the ability to communicate over the network and to preform various operational functions. As seen in FIG. 2, operating system 39 is preferably Linux, although it can be appreciated that other types of operating systems could also be used. A Secure Printing Application (SP) 36 is also included in NEL 35. One function of SP application 36 is to provide cryptographic functionality for NEL 35, such as generation of cryptographic keys, decryption of print jobs, etc., and makes use of the following cryptographic algorithms and functions: RC4 (symmetric key encryption/decryption), RSA, using PKCS #1, version 1.5 (asymmetric key encryption/decryption; digital signatures/verification), HMAC (message authentication code), SHA-1 (hashing algorithm), and a Random Data Source (for local generation of asymmetric key pairs). NEL 35 also includes Printing Proxy 37 (which may be, for example, an LPR proxy for UNIX or Windows applications, or a Windows proxy for Windows applications) for communicating with print spooler 14 of client workstation 10 (or a print spooler contained in print server 30), and for communicating with printer 20.

Printer 20 is seen to include NEL interface 21 for communication with NEL 35, and print engine 22. Of course, printer 20 could be virtually any network printer that can receive print jobs over a network, but in a preferred embodiment of the invention, printer 20 is a Canon ImageRunner 5000 series printer. It should be noted that, while NEL 35 is depicted as a separate device connected to the network, with the device being external to printer 20, NEL 35 could be fully implemented within printer 20 instead. In this case, NEL 35 within printer 20 may be referred to as an embedded device (i.e., the device being embedded within the printer), or the functionality of the NEL could be implemented in firmware within printer 20 instead. However, as seen in FIGS. 1 and 2, NEL 35 is depicted as an external (stand alone) device which can be connected to an existing printer that does not have an embedded device. Thus, while the description that follows may refer to the external device NEL 35, it is to be understood that reference to an embedded device is to the NEL in general.

In utilizing the secure printing system of the present invention, encryption keys for the printer are required. The encryption keys are preferably a private/public keypair for the printer. The printer's keypair is preferably generated within NEL 35 by SP application 36. Of course, the keypair may also be generated outside of NEL 35 and installed in NEL 35 during the manufacturing process, but the present invention aims to reduce various shortcomings described above with regard to this conventional process by generating the encryption keys within NEL 35. The process of generating encryption keys within NEL 35 according to the invention will now be described with regard to FIG. 26.

In step S2600, a process is initiated in the printer driver to obtain the printer's public key. This process may be initiated by the printer driver during installation and configuration of the printer driver on the client, wherein the client configuration software obtains the printer's public key directly from the printer. In a case where the printer driver has already been installed and configured in the client, the process to obtain the printer's public key is initiated by a user selecting a secure printing option in the printer driver for submitting a secure print job to the printer. It should be noted that in the latter case, a request for the printer's public key is preferably issued by the printer driver to the printer each time a user selects the secure printing option. In either case, the printer's public key is obtained directly from the printer by the printer driver issuing a request using a Secure Printer Management Protocol, which will now be described in more detail with regard to FIGS. 4, 5A and 5B.

In the Secure Printer Management Protocol (SPMP) of the present invention, requests are communicated between the client and the NEL using standard TCP/IP protocol. The request message format is shown in FIG. 4, which consists of a series of fields. As seen in FIG. 4, the request consists of a message type field 50, an operation identifier field 51, a length field 52 and a data payload field 53. The message type field 50 is preferably a 16-bit field which denotes the basic message type that is being sent. Some possible message types are ($00_x$=Invalid, $01_x$=Request). Operation identifier field 51 is preferably a 16-bit field which denotes the specific operation that is being proformed. Possible types of operation identifiers are ($00_x$=Invalid, $01_x$=PUBLIC_KEY, $02_x$=KEY_VALIDATION_PAGE). Data length field 52 contains the length, in bytes, of the data payload contained in data payload field 53. Data payload field 53 contains data that is transferred with the request and is preferably randomly generated data that, as will be described below, is used as a source of entropy by the receiving device (NEL) to generate encryption keys. FIG. 5A depicts an example of a public key request message which is accompanied by a block of random data 54. The accompanying random data is obtained by the printer driver in the client (step S2601). The random data is preferably data that is accumulated within the client by the Windows CAPI and thus, the random data is specific to the client. In other words, the random data is data that has been collected by the Windows CAPI over the lifetime of the client workstation and is data that relates to specific operations, etc. performed in the client workstation. Having formed the public key request message, the client transmits the request message to NFL 35 in step S2602 (or printer 20 if the NEL is embedded).

The NEL (or printer) receives the key request message (which includes the random data) (step S2603) and based on the message type (key request), determines whether or not the public key is already present in the NEL (step S2604). It should be noted that the printer's public key may not be present in the NEL where the NEL is relatively newly installed on the network and where the printer's keypair was not installed in the NEL during manufacturing. It should also be noted that, once the NEL is installed on the network, SP application 36 collects random data generated within the NEL during operation and stores the random data within SP application 36 for future use as a source of entropy in generating encryption keys. Such random data may be generated where the printer is utilized for printing non-secure print jobs and the random data may comprise data relating to network timings, time for printing the non-secure print jobs, number of pages printed, temperature variations within the printer, etc.

Figure 26:
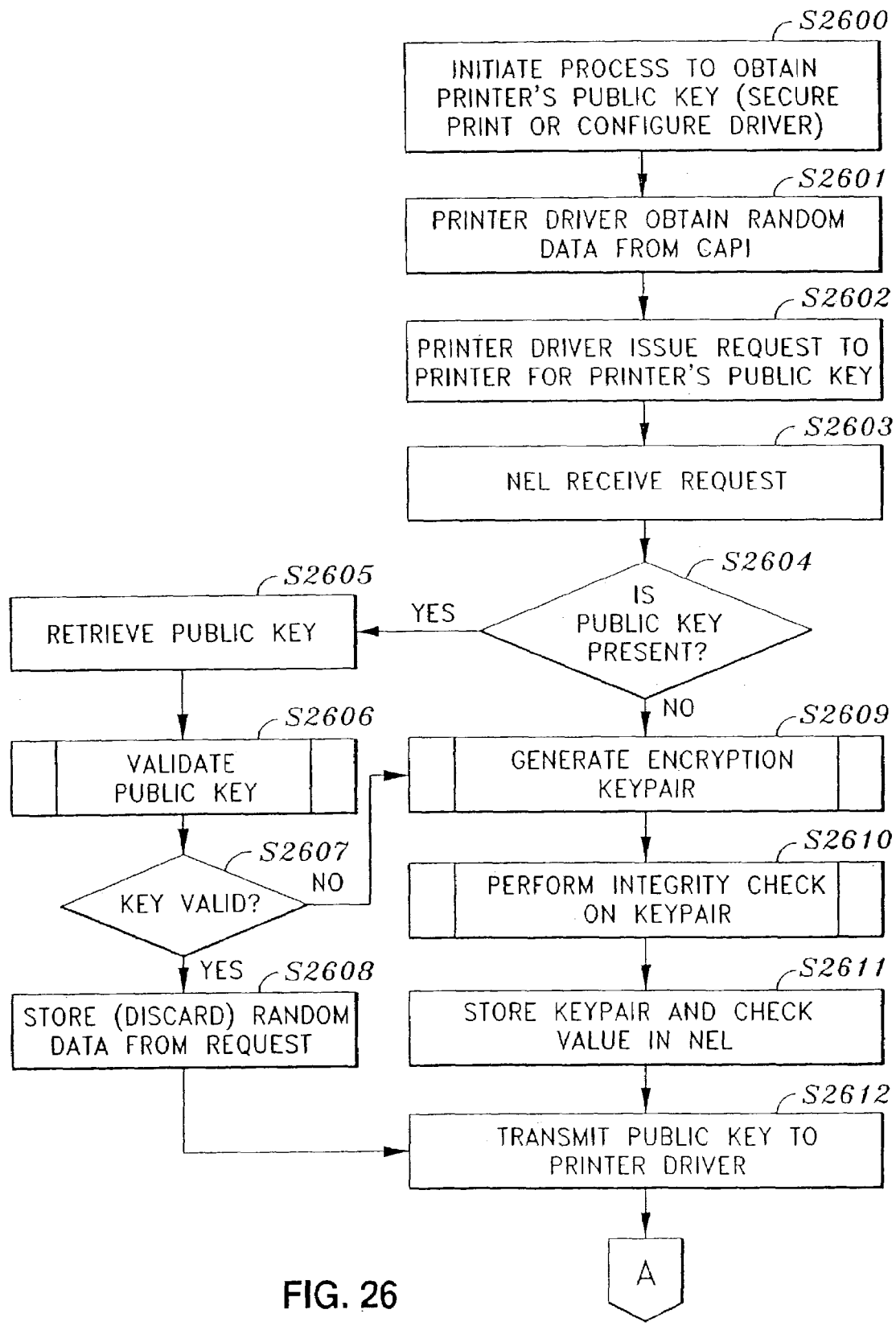
FIG. 26 is a flowchart of process steps for generating an encryption keypair within the NEL according to the invention.

Returning to step S2604, if the printer's public key is already present in NEL 35, then the public key is obtained from its secure storage location, together with a hash value that was generated when the public key was installed or previously generated in the NEL (step S2605). While FIG. 26 depicts retrieval of the printer's public key, it may be preferred to retrieve both the public key and the printer's private key, as well as their respective associated hash values, so that the integrity check steps described below can be performed to confirm the integrity of both keys at the same time. In this regard, SP application 36 performs an integrity check on the public key (and optionally the private key as well) by, for example, performing a SHA-1 hashing algorithm on the public key to obtain a hash value (step S2606). The hash value obtained in the integrity check is then compared with the integrity check value (hash value) retrieved in step S2605 to determine whether or not the public key (and possibly the private key) is valid (i.e., has not been corrupted or changed) (step S2607). If the key is determined to be valid, then the random data received with the key request message can be discarded and the public key is transmitted to the client as a public key response (step S2612), which will be described in more detail below. Alternatively, rather than discarding the random data, it can be stored in the NEL with the random data generated within the NEL itself for possible future use in generating new encryption keys.

Referring again to step S2604, if it is determined that no public key is present in the NEL, then a new encryption keypair (public/private keypair) is generated within the NEL by SP application 36 (step S2609). The process of generating encryption keys preferably mixes the random data generated within the NEL itself, and the random data received by the NEL with the key request message. Virtually any known technique for generating a public/private keypair can be used so long as the process mixes the random data from the NEL and the random data received with the key request to seed the key generation process.

Once the new encryption keypair is generated, an integrity check is performed on each key, where the integrity check preferably comprises performing an SHA-1 hashing algorithm over the key to obtain a hash value (step S2610). The hash value obtained for each key and the keys themselves are then stored in the NEL (step S2611), and the public key is transmitted to the client as a public key response (step S2612). It should be noted that the request for the NEL's public key may be transmitted from the client to the NEL in plaintext with no encryption required. Likewise, the NEL may return its public key in plaintext format.

Figure 28:
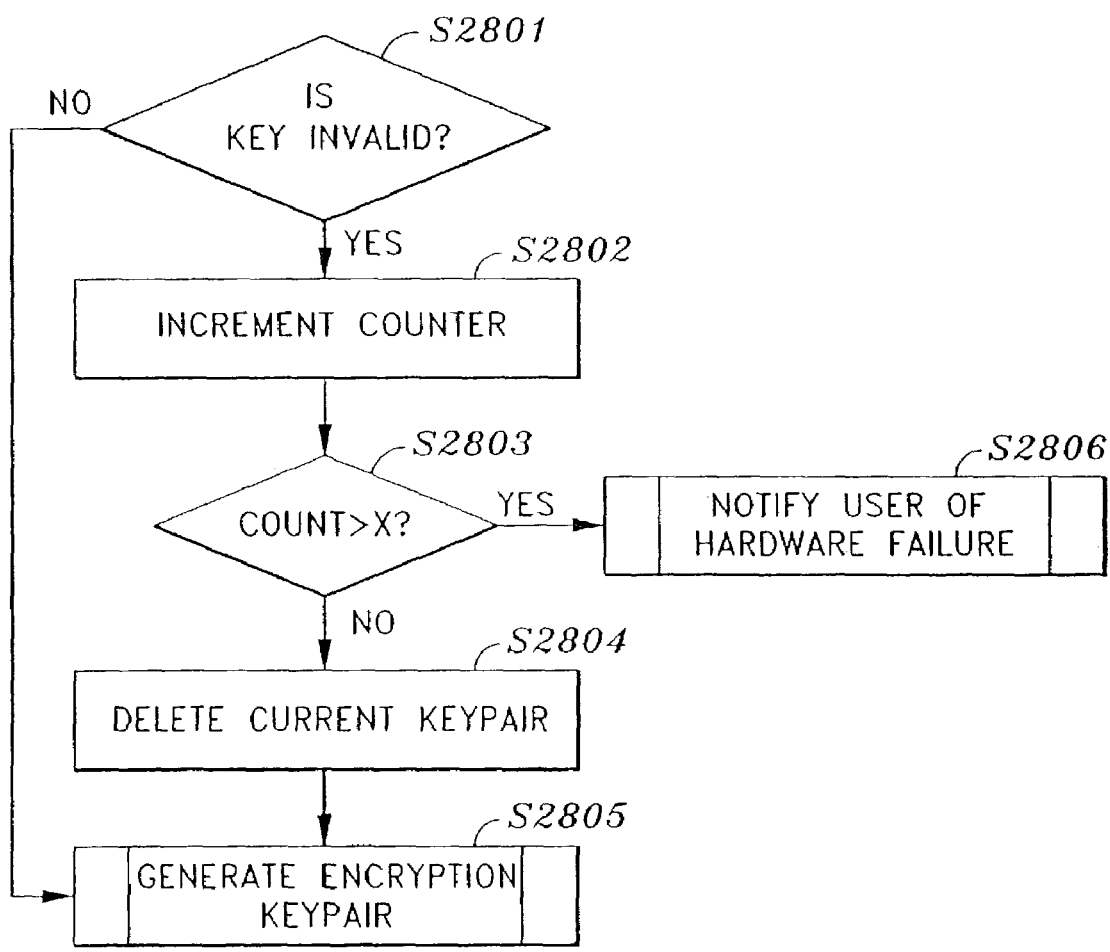
FIG. 28 is a flowchart of process steps for a client to validate a new public key.

Returning again to step S2607, if the NEL determines that a public key is already present in the NEL (YES in step S2604), but the key (either the public or the private key) is found to be invalid (NO in step S2607), flow proceeds to step S2609 to generate a new encryption keypair. This process is the similar to that described above, but includes some additional steps as seen in FIG. 28. In FIG. 28, when the key is found to be invalid in step S2607, the key generation process is notified of such (step S2801) and the key generation process is initiated on this basis. In the process described above, where it is determined in step S2604 that no public key is present, the determination in step S2801 would be NO and the key generation process described above for step S2609 is performed. However, where the existing key is found to be invalid, a counter is incremented in step S2802 to count the number of times that a keypair has been found to be invalid (corrupt). It is then determined whether the keypair has been found to be corrupt more than a predetermined number of times (X), which may be, for example, 3 (step S2803). If the key has been found to be corrupt more than the predetermined number of times, then the user is notified of a hardware error. This may comprise a light, buzzer or other indicia being provided on the NEL (or printer) itself, as well as providing the printer driver in the client with a message that a hardware failure has occurred (step S2806). If the predetermined number of times has not been exceeded in step S2803, then the current (corrupt) keypair and their associated hash values are deleted from the NEL (step S2804), and a new encryption keypair is generated in step S2805. The new encryption keypair is generated as described above utilizing the source of entropy accumulated within the NEL itself and the random data included with the key request.

In accordance with the foregoing process, if a printer's public key is not present in the NEL, an encryption keypair (public/private keypair) of the NEL (or its associated printer) is generated within the NEL device itself when the NEL receives a request from the client for the NEL to provide the client with the printer's public key. The encryption key generation process utilizes the two different sources of entropy to seed the key generation process. If the public key is already present, it is validated and, if found to be valid, transmitted to the client. If the public key is present and found to be invalid, a new encryption keypair is generated within the NEL with the new public key being transmitted to the client. A more detailed description will now be provided of the public key response provided by the NEL to the client, and processing within the client upon receiving the public key response.

Figure 7:
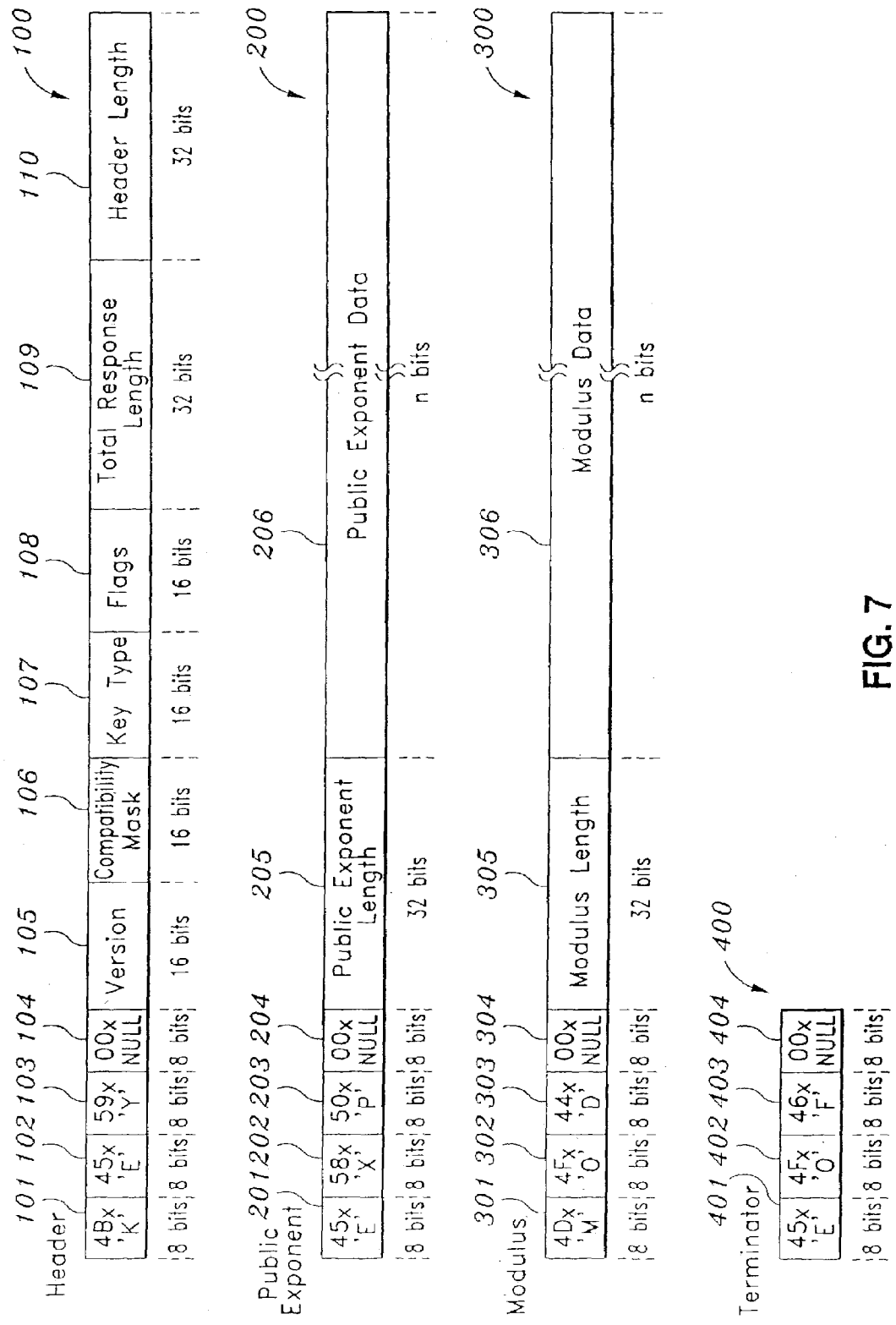
FIG. 7 is a block diagram depicting a format for a public key response.

Referring to FIGS. 6 and 7 for the public key response, FIG. 6 depicts source code (i.e., cleartext) for a public key response transmitted from NEL 35 to client workstation 10, while FIG. 7 depicts a block diagram of the format of the public key response. As seen in FIG. 7, the response includes four portions: header 100, public exponent 200, modulus 300, and terminator 400. It should be noted that, while FIG. 7 shows each portion of the response as being separate blocks, the response is actually a single message, with each block appended to one another. Each of the four portions of the public key response will now be described in more detail.

As shown in FIG. 7, header 100 is a group of fields that contain general information, such as the public key algorithm used and other formatting information. The first four bytes (101–104) contain a Public Key Response Identifier, $4B_x$, $45_x$, $59_x$, $00_x$ ("KEY"), identifying the formatting as a Public Key Response. Version field 105 contains a 16-bit value identifying the version of the Public Key Response format used to transfer the key. Compatibility Mask field 106 contains a 16-bit value identifying the minimum version of the Public Key Response format that a recipient must support to be able to recover the data from the message. For example, if the Version field contains "3" and the Compatibility Mask field contains "2," the file was formatted in Public Key Response format version 3, but it is compatible with, and can be recovered by clients that support, version 2 or greater. A value of zero in this field indicates that the recipient version must be at least as high as the version indicated in the Version field. Key Type field 107 contains a 16-bit value identifying the algorithm that is being used. Flags field 108 contains optional flags. Total Response Length 109 is a 32-bit field that contains the length of the entire Public Key Response message, in bytes, from the beginning of the Public Key Identifier (101) through the end of the Check Value field (404). Header Length 110 is a 32-bit field that contains the length of the header section of the Public Key Response message, in bytes, from the beginning of the Public Key Identifier (101) through the end of the Header Length field 109. This value can be used to locate the beginning of the Public Exponent portion 200.

The Public Exponent 200 is a group of fields that are used to support the transfer of the RSA public exponent. It includes the public exponent itself, and other formatting information. As seen in FIG. 7, the public exponent 200 includes a Public Exponent Identifier, which comprises the first four bytes (201–204), $45_x$, $58_x$ $50_x$, $00_x$ ("EXP"), identifying the beginning of the Public Exponent block. Public Exponent Length 205 is a 32-bit field that contains the length of the Public Exponent section of the Public Key Response message, in bytes, from the beginning of the Public Exponent Identifier (201) through the end of the Public Exponent data field 206. This value can be used to locate the beginning of the Modulus block 300. The Public Exponent Data 206 is a variable-length field that contains the RSA public exponent. The exponent is constructed as a block of bytes, in network order, most-significant-bit first.

Modulus 300 is a group of fields that are used to support the transfer of the RSA modulus. It includes the RSA modulus itself, and other formatting information. The first four bytes (301–304) contain the Modulus Identifier, $4D_x$, $4F_x$ $44_x$, $00_x$ ("MOD"), identifying the beginning of the Modulus block. Modulus Length 305 is a 32-bit field that contains the length of the Modulus section of the Public Key Response message, in bytes, from the beginning of the Modulus Identifier (301) through the end of the Modulus Data field 306. Modulus Data 306 is a variable-length field that contains the RSA modulus.

Finally, Terminator 400 is a field that is used to identify the end of the Public Key Response. The terminator value consists of a fixed ASCII identifier, "EOF", immediately following the Modulus Data 306. The Terminator comprises four bytes (401–404) that contain the Terminator, $45_x$, $4F_x$, $46_x$, $00_x$ ("EOF"), identifying the end of the Public Key Response.

Figure 27:
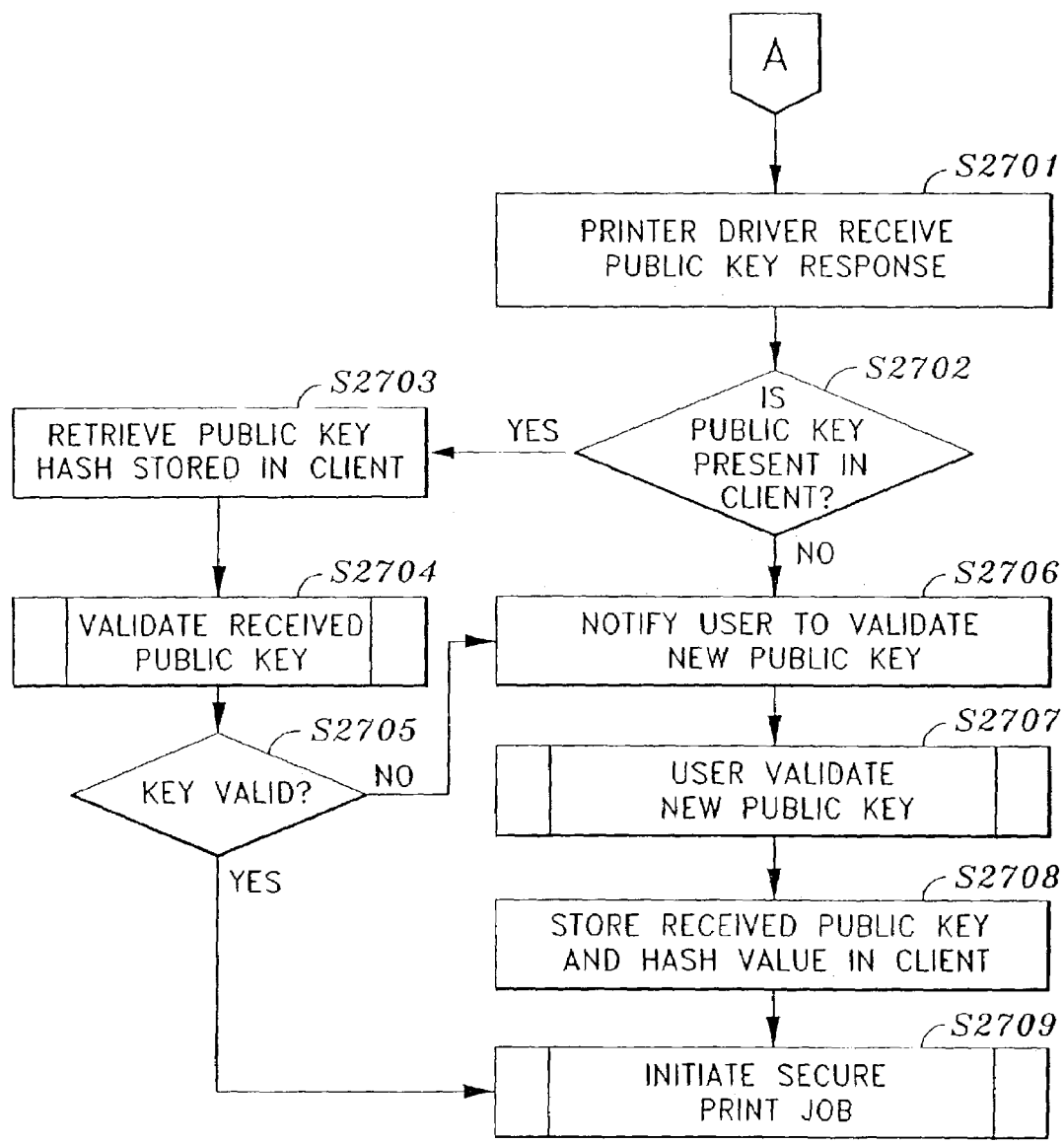
FIG. 27 is a flowchart of process steps for generating a new encryption keypair to replace a corrupt keypair.

Referring now to FIG. 27, the printer driver receives the public key response in step S2701 and determines, based on the received encryption key, whether or not to transmit the secure print job to the printer. The purpose for this determination is confirm that the printer has the ability to process a secure print job (i.e., includes the NEL's functionality) and that the printer has the appropriate encryption keys, such that the printer will not needlessly print out garbled data if a secure print job is transmitted to the printer and the printer is not able to properly process the job. Briefly stated, the determination comprises determining whether or not the received encryption key matches an expected value such that if the key does not match, the print job is not transmitted to the printer and the user is alerted that the printer's public key has changed. In more detail, a determination is made whether the printer's public key is already present in the client workstation (step S2702). This may the case where a request for the printer's public key was previously issued by the printer driver, either during installation of the printer driver or a previous secure printing request. If the printer's public key is already present in the client, then the printer driver retrieves the stored public key and its associated hash value from within the client (step S2703) and validates the received public key (step S2704). The validation process may comprise performing a hashing algorithm on the received public key and comparing the resultant value with the hash value retrieved from within the client to validate the received public key, or other means such as that described in co-pending U.S. application Ser. No. 10/010,974. Alternatively, the client workstation may perform a hashing algorithm over both the public key retrieved from within the client as well as the public key received from the NEL and compare the resultant values to validate the public key. The purpose of validating the public key received from the NEL by the client is to ensure that the public key has not been changed. Thus, if the key if found to be valid, the received public key is utilized to generate a secure print job, as will be described in more detail below. If however, the received public key is found to be invalid (i.e., the public key has changed), or if it is determined in step S2702 that the public key is not present in the client (i.e., this is an installation and configuration process of the printer driver), then the process proceeds to step S2706.

In step S2706, the user is notified that the public key needs to be validated. If the printer driver is being installed and configured, the notification may merely comprise part of the installation procedures. If however, the printer driver has already been installed and configured, and the printer's public key is found to have changed, then the notification may more specifically inform the user that the printer's public key has changed and that the new public key needs to be validated. In either case, the user agrees to validate the public key (step S2707) and a key validation request message is transmitted to the NEL (or the printer) to print out a key validation page. As an alternative, rather than the printer driver issuing a key validation request message to the NEL or the printer, a user may initiate printout of a key validation page at the printer by, for example, pressing a button on the printer, thereby issuing a key validation request. FIG. 5B is an example of such a message that is used to cause the printer to print a key validation page, containing a human-readable validation string, derived from a hash of the printer's public key. In this regard, the hash of the printer's public key (stored in the NEL) is also accessible, in human-readable format, as a field in a test page, which is initiated by user input from a control panel on the printer and in performing the verification, the user obtains a test page directly from the printer, which includes the SHA-1 hash of the printer's public key. The user then enters the hash value that was obtained in this manner into a configuration dialog provided by the printer driver. The printer driver's setup utility computes a hash on the key that it obtained directly from the printer and compares the result to the hash value that was obtained by the user from the printer's test page. If the hash values are identical, the printer's public key has been verified and is permanently installed in the client system (step S2708). After verification, the key is digitally signed by the driver, using native Windows features, to prevent tampering. If the hash value calculated over the received public key does not match the hash value displayed on the test page and entered by the user, an error message is presented to the user and the installation process fails. If such a failure occurs, the printer's public key is not installed into the client system and the printer driver will not allow secure print jobs to be sent to the printer. Ideally, printing of the validation code should be initiated locally at the printer, with the printer in the offline state. However, the validation code may be generated by the NEL, with the NEL then generating a test page containing the validation code. This validation code page is then transmitted to the printer, using a local network interface between the NEL and the printer, as LPR data. In order to provide flexibility in the choice of hash algorithms, a single-byte field (referred to as an "Algorithm Designator"), indicating the hash algorithm in use, is preferably prepended to the actual hash result. Using this implementation, when the user enters the value obtained from the test page into the client's installation dialog, the algorithm in use will be known to the client. The actual key validation code is created by combining the Algorithm Designator with the hash value, and then applying an alphanumeric transform to the result. The printed values on the test page are then displayed as a series of alphanumeric characters, as shown in FIGS. 3A and 3B, with the Algorithm Designator corresponding to box 40.

The validity of the key may also be ensured using a public key infrastructure (PKI). In this implementation, the printer's key is delivered within a cryptographic certificate, signed by a trusted certification authority. In that case, the installation program verifies the integrity of the key by verifying the signature and other information contained in the certificate. In the absence of a functional public key infrastructure (PKI), however, the implementation described above is preferred. Further enhancements to the key distribution process may also include administrative tools that allow the printer's public key and hash to be installed into the client driver from a floppy disk or a secure website. Such tools may improve the ease of installation, but can also pose added security risks.

Once the printer's public key has been properly validated in the client workstation, the user is able to submit a secure print job for printing (step S2709). When a user selects an option for a secure print job, another, encryption key (referred to as a "session" or "symmetric" key) is generated by the user mode print driver. As is known in the art, symmetric keys are generated using what is referred to as a source of entropy (i.e., randomly generated data). In the present invention, entropy for use in generating the symmetric key is preferably obtained using standard Windows Cryptographic Application Programming Interface (CAPI) methods. The symmetric key obtained in this manner is preferably only used for a single print job, after which it is destroyed. All remnants of the symmetric key are destroyed by overwriting, such that the symmetric key cannot be recovered from the client system by any means. Remnants of the key, as well as any cleartext data buffers in system memory, are overwritten with a pattern, using at least one pass. Remnants of cleartext data buffers that exist on hard disk are overwritten using a technique corresponding to DOD 5220.22-M, "clear" level, or better. It should be noted that another possible source of unexpected leakage is the system's virtual memory mechanism. Some or all of an application's memory can be unexpectedly swapped out and stored in a swap file at any time. Therefore, techniques are preferably used that temporarily store sensitive material, including keys, in an area of memory that cannot be swapped.

Thus, the client, having received the public key response in the foregoing format, is provided with various information needed to generate a secure file in a secure file format, a detailed description of which will now be provided. Briefly, however, a secure file, and as will be described below, a secure file for a print job, is generated by generating a secure client header and appending encrypted print data thereto. As an enhancement, the encrypted print data appended to the secure client header may be processed further for additional security by performing integrity checks in a chaining fashion on the encrypted print data.

Figure 8:
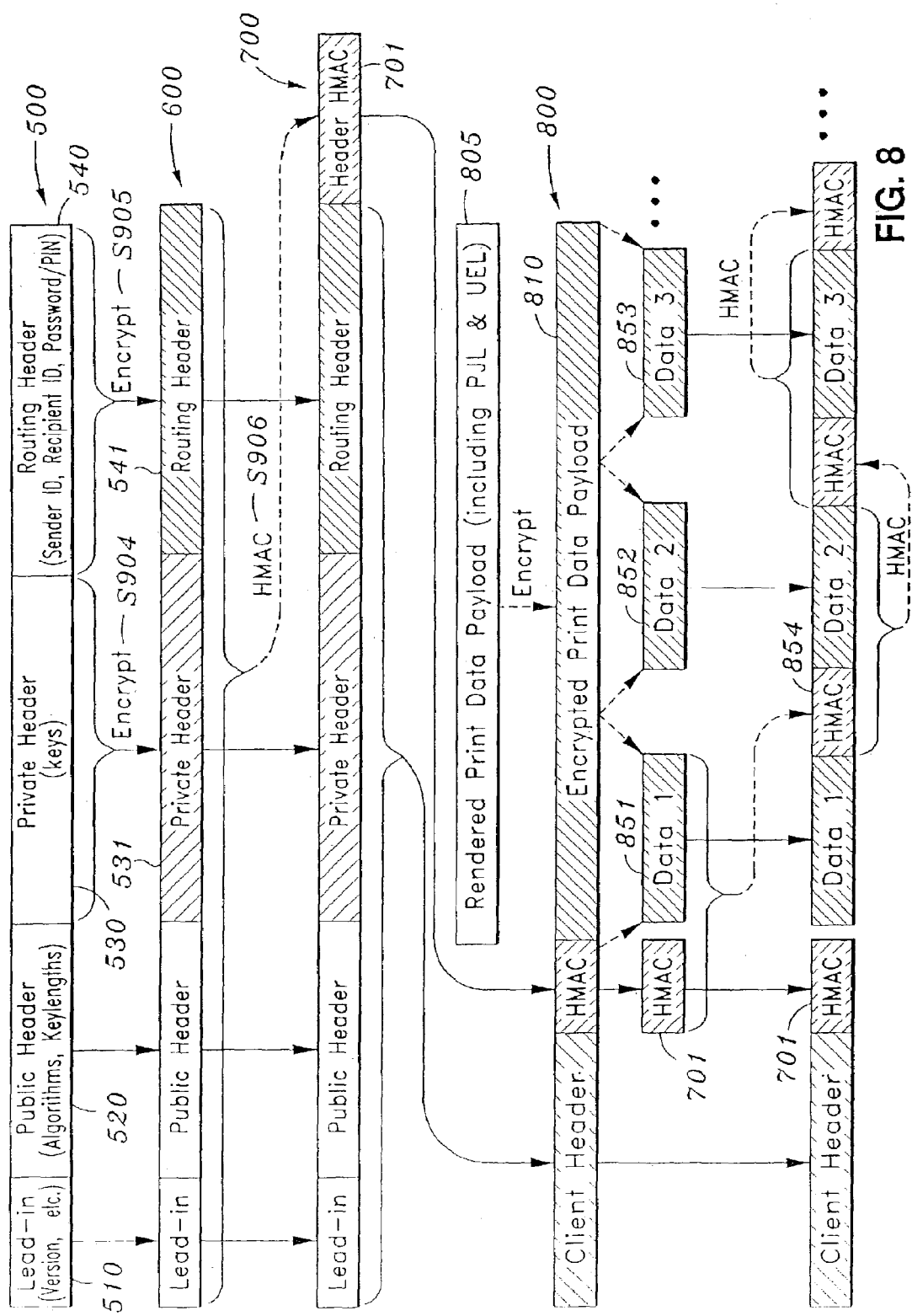
FIG. 8 depicts a process for creating a secure file according to the invention.
Figure 9:
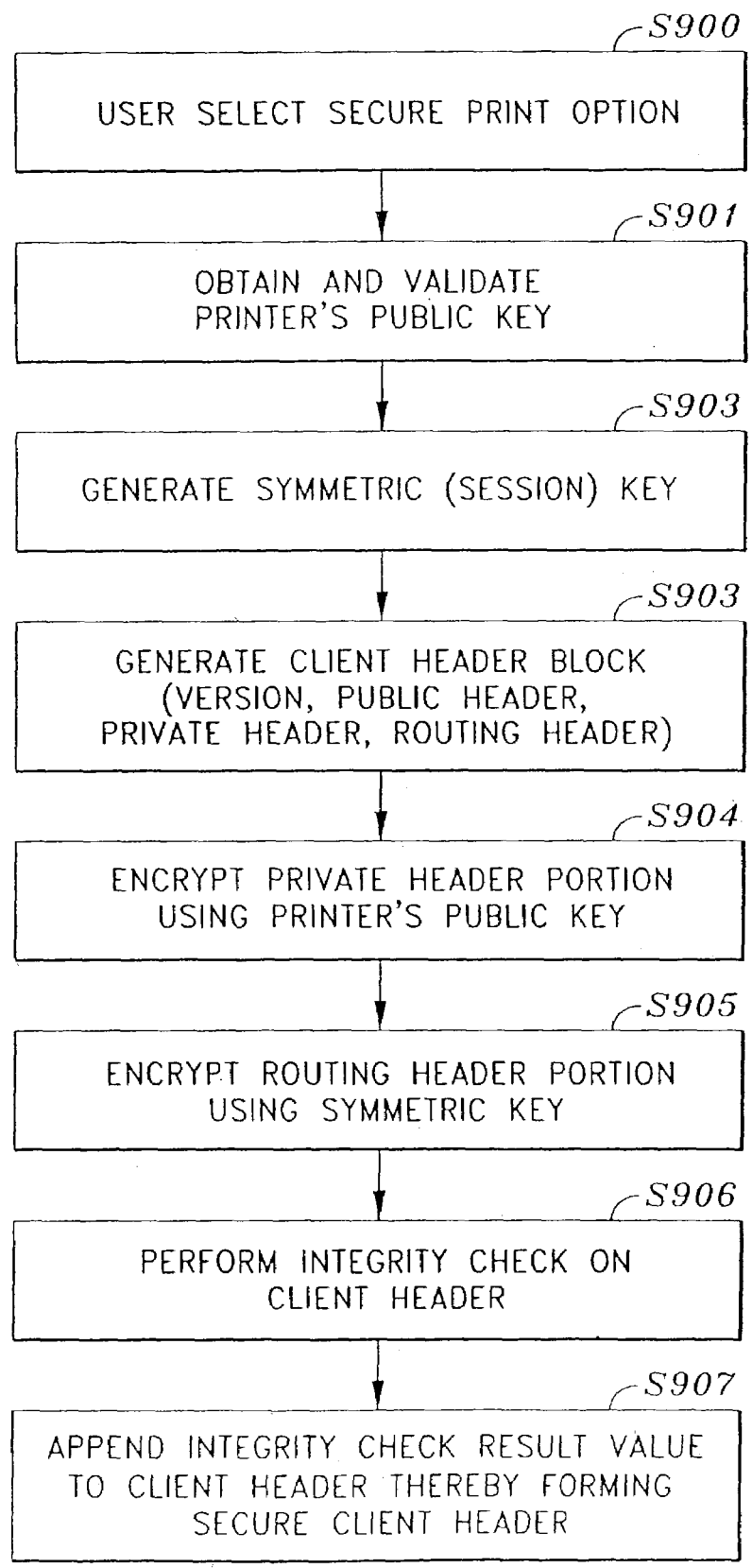
FIG. 9 is a flowchart of process steps for creating a secure client header according to the invention.

Referring now to FIGS. 8 and 9, a process of generating a secure client header will be described. It should be noted that FIG. 8 depicts a block diagram of various portions of a secure file format according to the invention, including the foregoing enhancement of the print data, while FIG. 9 focuses on the process steps for generating the secure client header. As seen in FIG. 9, when a user selects an option to submit a secure print job (step S900) from, for example, a print option in an application program of client computer 10, the print driver obtains the printer's public key (step S901) and preferably (although optional) validates the printer's public key. As described above, the printer's public key and a hash value thereof are preferably installed and configured in the print driver of the client computer when the print driver is first installed. In this case, the printer's public key may be obtained from a local storage medium in client computer 10 and a hashing algorithm (such as SHA-1) may be performed on the obtained key. The hash value that results from the foregoing process may then be compared with the hash value stored in the client computer to validate the printer's public key. As an alternative, the print driver may submit a request to the printer (or the NEL) to obtain the printer's public key directly from the printer (or the NEL). The printer's public key is then provided to the print driver, where it is validated by performing a hashing algorithm on the received public key and comparing the resultant value with the hash value stored in the client computer. After having obtained the printer's public key, or simultaneous thereto, the print driver generates a symmetric (session) key (step S902) for use in generating the secure client header. The foregoing process has also been described by the inventors herein in co-pending application Ser. No. 10/010,974, the contents of which are hereby incorporated by reference, and the process described therein could also be applied in the present invention.

In generating the secure client header, the user mode print driver first generates a client header (step S903), which as seen in FIG. 8, client header 500 comprises a lead-in block 510, a public header block 520, a private header block 530 and a routing header block 540. The contents of each of blocks 510, 520, 530, and 540 will be described in more detail below. It should be noted that routing header 540 is optional and may be included within client header 500 where a print job is designated as being destined to a particular recipient, or where the identity of the sender of the recipient is desired. That is, if the print job requires some type of recipient authentication before the print job is to be printed out, or if it is necessary to identify the sender of the print job, routing header 540 may be included, but otherwise can be omitted.

Having generated client header 500, the private header portion 530 thereof (or as will be described below, at least some portion of the private header) is encrypted using the printer's public key (step S904), thereby resulting in encrypted private header 531. Additionally, routing header 540 (or at least some portion thereof) is encrypted using the symmetric (session) key (step S905), thereby resulting in encrypted routing header 541. Thus, once the foregoing encryption processes have been performed, client header 500 is transformed into encrypted client header 600.

Continuing with the process for generating a secure client header, encrypted client header 600 is subjected to an integrity check (step S906). The integrity check performed is preferably a Hashing Message Authentication Code (HMAC) algorithm, although any other type of integrity check could be used instead. The integrity check result value (HMAC value 701) is then appended to the encrypted client header 600 (step S907), thus transforming header 600 into secure client header 700.

To complete one embodiment of a secure file format, print data payload 805 is encrypted with the symmetric (session) key, thereby resulting in encrypted print data payload 810. The encrypted print data payload 810 is appended to the secure client header 700 to form the secure print file 800. The secure print file 800 is then transmitted to the NEL via connection 1. As briefly stated above, an enhancement may be performed on the encrypted print data payload 800 and this process will be described in more detail below. However, first, a more detailed description of the contents of client header 500, and in particular, the contents of lead-in block 510, public header block 520, private header block 530, and routing header block 540 will be provided.

Referring now to FIG. 10A, Lead-In block 510 is a group of fields that contain general information identifying the file as a Secure Print format and providing necessary information such as the version of Secure Print file format used and other formatting information. Lead-In block 510 is seen to include a Secure Print File Identifier (blocks 501 to 504). The first four bytes (501–504) contain the Secure Print File Identifier, x43, 0x53 0x50, 0x00 ("CSP"), identifying the formatting as a Secure Print file format. Version block 511 is a field that contains a 16-bit value identifying the version of Secure Print format used to prepare this file. Compatibility Mask 512 is a field that contains a 16-bit value identifying the minimum version of the Secure Print format that a recipient must support to be able to recover the data from this file. For example, if the Version field contains "3" and the Compatibility Mask field contains "2," the file was formatted in Secure Print format version 3, but it is compatible with, and can be recovered by clients that support version 2 or greater. A value of zero in this field indicates that the recipient version must be at least as high as the version indicated in the version field. Total Header Length 513 is a 32-bit field that contains the length of the entire Secure Print header, in bytes, from the beginning of the Secure Print File Identifier (501) through the end of the header hash (reference numeral 555 of FIG. 10C). This value can be used to locate the beginning of the Payload Data. Lead-In Length 514 is a 32-bit field that contains the length of the lead-in section of the Secure Print header, in bytes, from the beginning of the Secure Print File Identifier (501) through the end of Payload Data Length field 516. This value can be used to locate the beginning of the Public Header. Option Mask 515 contains a 32-bit field that identifies any options that were selected when this file was generated. Each bit (or bit field) is used to select a separate option. The contents of this field inform the receiving device (printer) which options were selected when the file was constructed by the sending client. Some values that may be used in the options mask field are shown in FIG. 11. Payload Data Length 516 is a field that contains an optional 32-bit value that describes the total size of the Payload Data section of the Secure Print file. It contains the total number of bytes, beginning with the Payload Data Identifier (44$_x$, 41$_x$, 54$_x$, 00$_x$) and ending with the End of File Identifier (45$_x$, 4F$_x$, 46$_x$, 00$_x$), inclusive (these will be described in more detail below). This field is optional. Where it is possible for the sending client to do so, this field can be used to provide size information to the receiving entity (such as a printer). Printer drivers that are not aware of the total data payload size at the time the header is transmitted, and thus cannot make use of this field, must set all the bits in this field to zero and must also set the Payload Data Length Present bit to "0."

FIG. 10B depicts a block format for the contents of Public Header 520. The Public Header is a group of fields that contain information identifying the encryption algorithms and key lengths used to prepare the Secure Print file. The first four bytes (521–524) contain the Public Header Identifier, (50$_x$, 55$_x$, 42$_x$, 00$_x$) ("PUB"), identifying the beginning of the Public Header. This field is not required for function purposes, but is included to facilitate manual examination of a Secure Print file. Thus, this field could be eliminated. Public Header Length 525 is a 32-bit field that contains the length of the Public Header, in bytes, from the beginning of the Public Header Identifier (521) through the end of the Hash Length field (529*b*). This value can be used to locate the beginning of the Private Header. Public Key Algorithm 526*a* is a field that contains a binary value, which identifies the public-key algorithm used to process the public-key-encrypted fields that follow. Some values that may be used for this field are shown in FIG. 12. Public Key Length 526*b* is a field that contains the length, in bits, of the public key used to process the public-key-encrypted fields that follow. Support is preferable for 1024-bit RSA public keys and some values for this field are shown in FIG. 13. Symmetric Key Algorithm 527*a* is a field that contains a binary value, which identifies the symmetric-key algorithm used to perform bulk encryption of the data and other fields. Some values for this field are shown in FIG. 14. Symmetric Key Length 527*b* is a field that contains the length, in bits, of the key used to perform bulk encryption of the data and other fields. Support is preferable for 128-bit RC4 symmetric keys and some values that may be used in this field are shown in FIG. 15. Signature Algorithm 528*a* is a field that contains a binary value that identifies the digital signature algorithm used to sign the hash values. Some examples of values for this field are shown in FIG. 16. Signature Key Length 528*b* is a field that contains the length, in bits, of the key used to apply a digital signature to the signed hash fields. Some example values for this field are shown in FIG. 17. Hash Algorithm 529*a* is a field that contains a binary value which identifies the symmetric-key algorithm used to perform bulk encryption of the data and other fields. Some example values for this field are shown in FIG. 18. Hash Key Length 529*b* is a field that contains the length, in bits, of the hash key. A hash key is required only if keyed hashes (such as HMAC) are employed. Some example values for this field are shown in FIG. 19.

FIG. 10C depicts a block diagram of a format for Private Header 530. The Private Header is a group of fields that contain secret information required to decrypt a Secure Print file and to allow a user to authenticate himself at the printer. The first four bytes (532–525) contain a Private Header Identifier, (50$_x$, 52$_x$, 56$_x$, 00$_x$) ("PRV"), identifying the beginning of the Private Header. This field is not required for function purposes, but may be included to facilitate manual examination of a Secure Print file. Private Header Length 536 is a 32-bit field that contains the length of the Private Header, in bytes, from the beginning of the Private Header Identifier (532) through the end of the RSA-Encrypted Key block 537, containing the symmetric key and the hash key. This value can be used to locate the beginning of the Routing Header. RSA-Encrypted Key block 537 contains both the symmetric key and the hash key, which have been concatenated and encrypted, using the public key of the target printer. Recall from above that at least a portion of Private Header 530 is encrypted to form encrypted private header 531 and the foregoing encryption of the symmetric key and hash key with the printer's public key comprise such encryption. The length of this block is equal to the length of the RSA modulus, in bytes. The length of the cleartext key values (before encryption) is specified in the Symmetric Key Length (527*b*) and Hash Key Length (529*b*) fields of the Public Header, respectively. A description of the cleartext versions of these two keys (before encryption) is as follows.

The "Symmetric Key" field is the symmetric key that is used to encrypt the data payload. This same key is used to decrypt and recover the original plaintext data. The length of the symmetric key is contained in the Symmetric Key Length (527*b*) field of the Public Header. The "Hash Key" field is the HMAC or other hash key that is used to calculate the message authentication code (MAC) that follows each block of the encrypted payload data (this process will be described in more detail below). This same key is used by the receiving entity to validate the data in each block. The length of the hash key is contained in the Hash Key Length (529*b*) field of the Public Header.

Figure 10D:
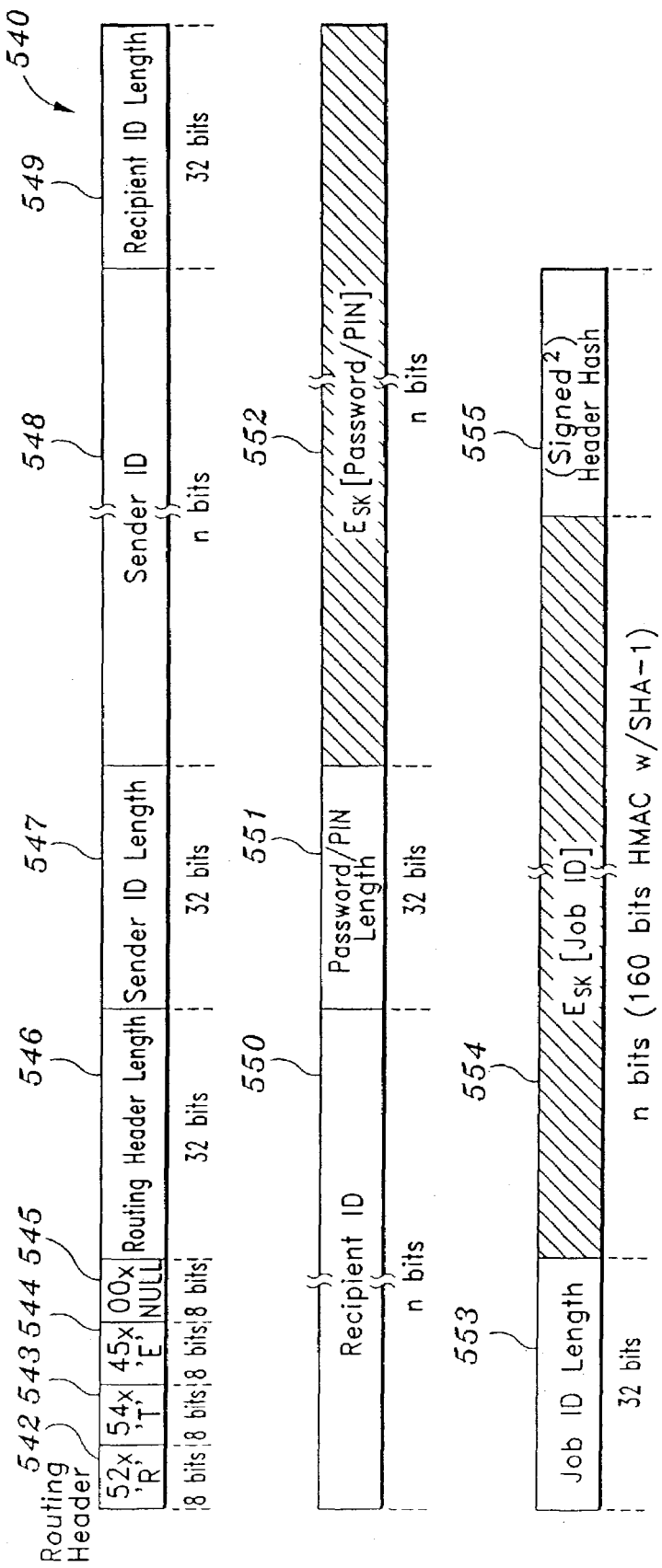
FIG. 10D is a block format for a Routing Header portion of a secure client header.

Referring now to FIG. 10D, Routing Header 540 is a group of fields that contain information identifying the sender and the recipient of the Secure Print file. The first four bytes (542–545) contain the Routing Header Identifier, ($52_x$, $54_x$, $45_x$, $00_x$) ("RTE"), identifying the beginning of the Routing Header. This field is not required for function purposes, but may be included to facilitate manual examination of a Secure Print file. Routing Header Length 546 is a 32-bit field that contains the length of the Routing Header, in bytes, from the beginning of the Routing Header Identifier (542) through the end of the Header Hash field (555). This value can be used to locate beginning of the Payload Data. Sender ID Length 547 is a 32-bit field that contains the length of the Sender ID field 548, in bytes. If the Sender ID Encrypted bit in the Option Mask field is set to "1," this field is encrypted with the symmetric (session) key. Sender ID field 548 contains identifying information that can be used to uniquely identify the sender of the Secure Print data, including any padding bytes. Depending on the application, this field may contain a relatively short ASCII or Unicode identifier, such as a user's login name, a numeric user ID or even a more lengthy, fully-qualified user name. If the Sender ID Encrypted bit in the Option Mask field is set to "1," this field is encrypted with the symmetric (session) key.

Recipient ID Length 549 is a 32-bit field that contains the length of the Recipient ID field 550, in bytes, including any padding bytes. If the Recipient ID Encrypted bit in the Option Mask field is set to "1," this field is encrypted with the symmetric (session) key. Recipient ID field 550 contains identifying information that can be used to uniquely identify the intended recipient of the Secure Print data. Depending on the application, this field may contain a relatively short ASCII identifier, such as a user's login name, a numeric user ID, or even a more lengthy, fully-qualified user name or even a signed certificate. Note that it may be desirable to maintain the sender information in cleartext, so that a recipient can obtain a signature-verification key for the sender, without having to perform a costly RSA decryption to obtain the symmetric key and then use the symmetric key to obtain the user information. If the Recipient ID Encrypted bit in the Option Mask field is set to "1," this field is encrypted with the symmetric key.

Password/PIN Length 551 is a 32-bit field that contains the length of the Password/PIN field 552, in bytes, including any padding bytes. This field is preferably, although optionally, encrypted with the symmetric key. Password/PIN field 552 contains a password or PIN (Personal Identification Number), which is used to authenticate a user who attempts to release a Secure Print job for printing. It will typically be entered by the user on a keypad at the printer. In this regard, it is desirable to provide the capability to use an alphanumeric password on the printer, where those characters can be supported by the user interface on the printer. It is also desirable to support extended (non-ASCII) characters for international applications. For that reason, the PIN, before encrypting, is stored in a series of 32-bit fields, using two bytes to represent each digit as a UCS-2 (16-bit) Unicode value. The data is stored in network order. Unused bytes are filled with Unicode null (NUL) characters. For example, a cleartext PIN value of "1234" (before encryption) may be constructed as shown in FIG. 20. For use with printers that can support alphanumeric passwords, a case-sensitive password (or PIN), before encrypting, may be stored as a null-terminated Unicode string. For example, a cleartext password value of "Hello World" (before encryption) may be constructed as shown in FIG. 21. In order to accommodate a Password/PIN field of variable length, the length of the password is indicated in the Offset to Key field that precedes the Password/PIN. The total length of the password field, including the terminating NULL and any additional padding bytes, should preferably be a multiple of 32 bits. If a password is used that does not fall exactly on a 32-byte boundary, it should be padded with extra nulls to fill out the remaining 32 bits. The "Password/PIN" field is preferably encrypted, using the randomly-generated symmetric key. This field is preferably always encrypted and this encryption constitutes the encryption of step S905 that transforms routing header 540 into encrypted routing header 541.

Job ID Length 553 is a 32-bit field that contains the length of the Job ID field 554, in bytes, including any padding bytes. This field is optionally encrypted using the symmetric key. Job ID field 554 contains the name of the printed document or other information used to identify the job in the printer's queue. This field is preferably encrypted using the symmetric key, and like the encryption of field 552, constitutes the encryption that transforms routing header 540 into encrypted routing header 541.

Signed Header Hash 555, while shown in FIG. 10D, is not part of the routing header, but actually represents integrity check value 701 shown in FIG. 8. This field contains a hash (or HMAC) of the entire Secure Print header, optionally signed by the sender. The signing key will typically be the RSA private key of the sender, but the use of other signing algorithms, such as the federal Digital Signature Algorithm (DSA), as specified in the federal Digital Signature Standard (DSS) may be used instead. The length of the signing key is contained in the Signature Length field 528*b* of the Public Header.

Thus, the file format depicted in FIGS. 10A to 10D makes up a secure client header according to the invention. However, as stated above, the routing header is optional and may be included where the print job is targeted for a specific recipient or where the identity of the sender is desired. To complete one embodiment of the secure file format according to the invention, print data is appended to the secure client header and a description of the print data payload will now be provided.

Figure 22:
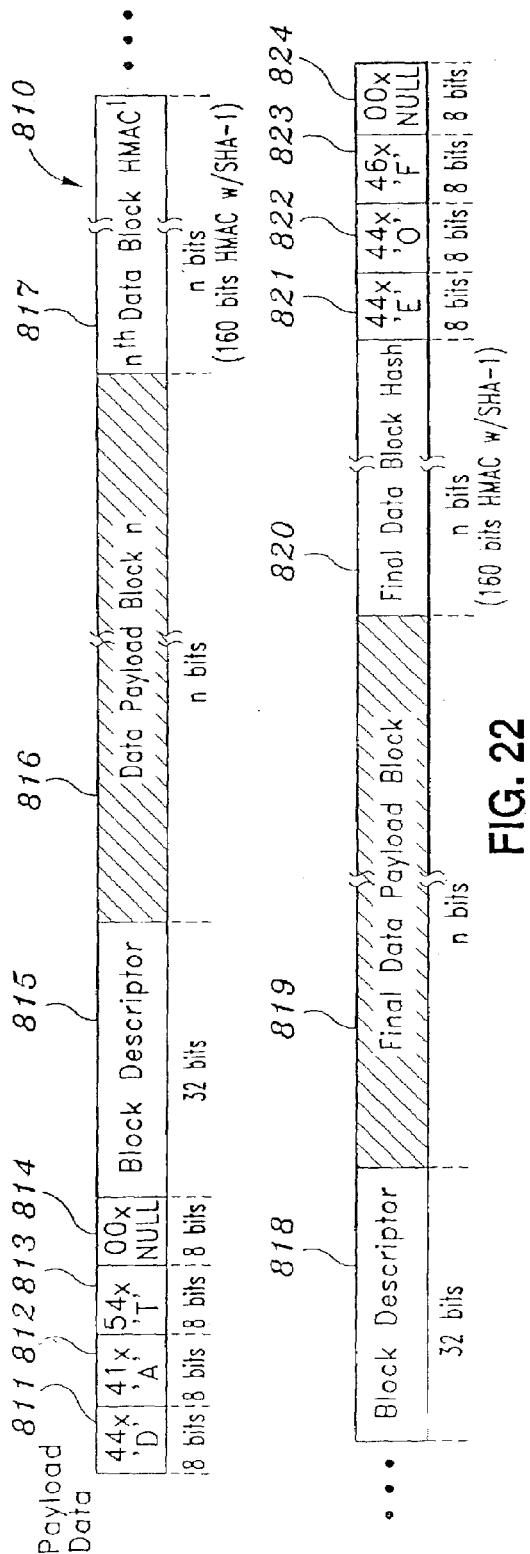
FIG. 22 is a block format for a data payload portion of the secure file format.

Referring back to FIG. 8, secure file format 800 is seen to include the secure client header 700, with encrypted print data payload 810 appended thereto. The format for the encrypted print data payload 810 is depicted in FIG. 22. As seen in FIG. 22, the first four bytes (811–814) contain a Payload Data Identifier, ($44_x$, $41_x$, $54_x$, $00_x$) ("DAT"), identifying the beginning of the Payload Data. This field is not required for functional purposes, but is included to facilitate manual examination of a Secure Print file.

Figure 23:
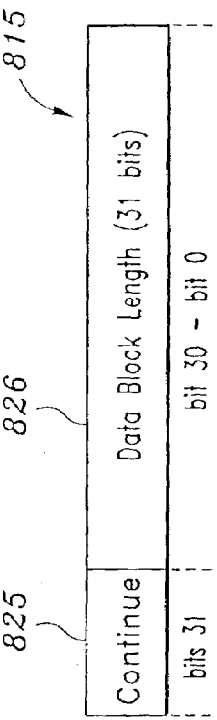
FIG. 23 is a block format for a block descriptor portion of the data payload block.

Block Descriptor 815 is a field that contains a 32-bit block descriptor, which describes the current encrypted data block. A layout of Block Descriptor 815 is shown in FIG. 23. The lower 31 bits (826) of the block descriptor contain the length of the current block, in bytes. Note that this length does not include the block hash that follows the data block itself. The upper bit (825) is defined as "Continue," and indicates whether or not more data blocks will follow this block. A "1" in this bit indicates that more data blocks will follow, and a "0" in this bit indicates that this is the final data block. It should be noted that the data payload is preferably sectioned into multiple blocks to facilitate processing on devices with limited storage and memory resources. This sectioning is represented in FIG. 8 by data blocks 851, 852, 853, etc. Thus, the Block Descriptor identifies each of the multiple blocks, and as seen in FIG. 22, Block Descriptor 815 represents the first block of the encrypted data payload, and Block Descriptor 819 represents the last block of the encrypted data payload. Of course, additional block descriptors would be included to represent each of any other encrypted data payload blocks. Additionally, if the print data payload is small enough, or if the printing device can handle large data payloads, only one data payload block may be included and it may not be necessary to break-up the data payload into multiple blocks.

The actual data payload is contained in Data Payload block 816 and is preferably encrypted using the symmetric (session) key generated by the client, thus forming the encrypted data payload.

Data Block HMAC 817 is a field that contains an integrity check result (hash) value, and in this case, an HMAC (Hashing Message Authentication Code) value. A hash or HMAC is provided for each block to allow the target device (printer) to determine that errors have occurred before reaching the end of a potentially large file. The use of a keyed hash, such as HMAC, allows the device to immediately determine that a block was damaged or tampered with, allowing the device to immediately terminate the job. The Data Block HMAC 817 is calculated over the previous HMAC (the header HMAC 701 in the case of the first data block, or the previous data block HMAC, in the case of the remaining data blocks), the current Block Descriptor and the ciphertext data for the current data block. A graphical representation of this chaining type of integrity checking is depicted in FIG. 8, wherein, for the first data block 851, an integrity check (HMAC) is run over the secure client header HMAC 701 and the first data block 851 to obtain a hash value 854. It should be noted that reference to data block 851 is merely a generalization and data block 851 includes the data descriptor field and the data payload as described above. The hash value 854 of FIG. 8 is placed in the Payload Data portion of the secure file format as block 817 of FIG. 22. An integrity check (HMAC) is then run for the second data block 852, with the HMAC being run over the previous HMAC (in this case, HMAC 854 of the first data block) and the second data block 852. The process continues in this chain fashion until an integrity check value (HMAC hash) has been obtained for each data block. Thus, in order to cause the final HMAC result to represent the integrity of the entire job, each preceding HMAC is combined with each subsequent data field, such that the last hash is a representation of the entire job.

Figure 24:
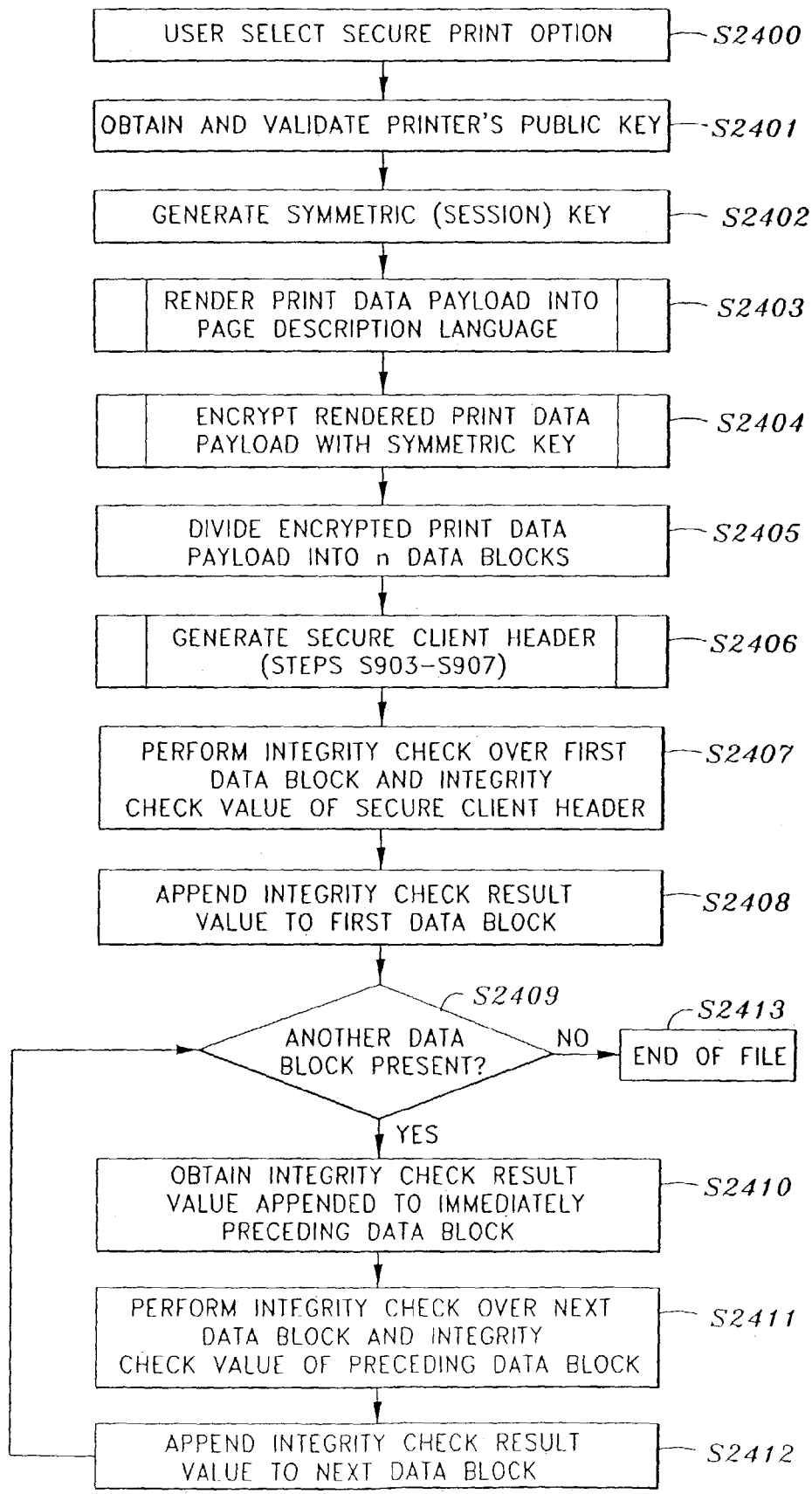
FIG. 24 is a flowchart of process steps for processing the data payload according to the invention.

The foregoing process is also depicted in a flowchart of FIG. 24. As shown in FIG. 24, when a user selects an option for a secure print job (S2400), the print driver obtains and validates the printer's public key (S2401) and generates a symmetric key (S2402). The print driver then commences rendering the print job data into a page description language (such as PCL or PostScript) based on the selected printer (S2403). The rendered print data is then encrypted with the symmetric key (S2404), and the encrypted data is divided into a plurality of data blocks (where n represents the number of data blocks). As an alternative, rather than processing the entire job (i.e., rendering the entire print job, encrypting the entire job and then dividing the job into a plurality of blocks), a dynamic approach may used where the print job is dynamically processed in a series of blocks, with each block being rendered, encrypted and, as will be described in more detail below, processed with an HMAC. The print driver also generates the secure client header as previously described with regard to FIG. 9, and in particular, steps S903 to S907. Of course, the secure client header may be generated prior to processing of the data payload and the secure client header transmitted to the printer ahead of the data payload. Once the secure client header is generated, an integrity check (preferably an HMAC) is run over the first of the n data blocks and the integrity check result value appended to the secure client header (S2407). The integrity check result value (HMAC) that results from step S2407 is appended to the first data block and appears in the secure file format as block 817 as described above with regard to FIG. 22. Then, it is determined whether all of the data blocks have been processed (i.e., whether any more of the n data blocks are present) (S2409). If additional data blocks are present, then the integrity check result value appended to the immediately preceding data block is obtained (S2410) and an integrity check (HMAC) is run over the obtained value and the next data block (S2411). The integrity check value that results from step S2411 is appended to the next data block (S2412) and flow returns to step S2409 to determine whether any additional data blocks are present that have not yet been processed. The process continues until all of the data blocks have been processed, at which point the end of file has been reached (S2413).

Thus, having processed the encrypted data payload according to the foregoing, a secure file format can be comprised of, not only the secure client header in conjunction with commonly encrypted payload data (i.e., data merely encrypted with the symmetric key but not divided and hashed), but the secure client header as described above in conjunction with the divided and hashed encrypted data payload.

Finally, the last portion of the secure file is an End-of-File Identifier. This field consists of four bytes (821–824) which comprise the End-of-File Identifier, ($45_x$, $4F_x$, $46_x$, $00_x$) ("EOF"). This is the final field in a Secure Print File, designating the end of the Secure Print job.

Figure 25:
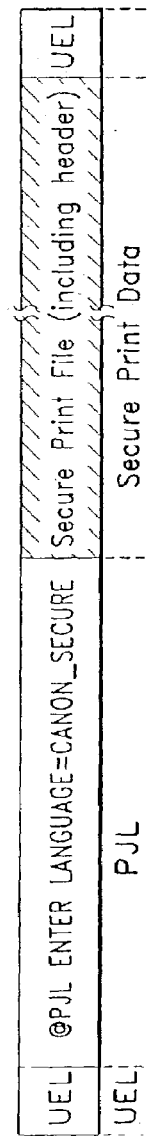
FIG. 25 is a block format of PJL-UEL encapsulation of a secure file format for transfer to the NEL.

While the foregoing described how a secure file format may be generated according to the invention, it can be understood that print data is formatted by a client's printer driver, using a number of successive steps, before it is finally delivered to the printer. First, an application's print data is rendered by the client printer driver in a format that is understood by the printer engine. This is typically done using Postscript, PCL or other printer languages. Next, the driver packages the rendered data in the secure print file format, as described above. This step applies encryption and proprietary headers to the rendered data. Finally, the data is formatted for delivery to the printer, adding fields that describe the printer language that is used and other optional printer control parameters. This latter step may be accomplished using an additional Printer Job Language (PJL) command, paired with a terminating Universal Escape Language (UEL) field. In other words, after the print data is prepared in the secure file format as described above, it may be encapsulated using an additional PJL-UEL command pair, which indicates that it is a secure file. An example format of this packaging is shown in FIG. 25. The NEL recognizes this command and processes the print data such that the plaintext, rendered print data is recovered and printed.

Of course, the invention is not limited to use with secure print jobs submitted to a printer, either directly or via the NEL. Rather, the secure file format of the present invention could be implemented in a number of embodiments other than secure print jobs. For example, rather than submitting a print job to a printer, a user can choose an option to print to a file using a virtual printer. In this case, the print file would be packaged as a secure file as described above, with the secure file then being stored in a designated location. Such a location may be, for example, on a local hard disk of client workstation 10, print server 30, on a removable storage medium such a floppy disk or CD-ROM, or any other storage area. In like manner, the secure file is not limited to a print file that is submitted to a virtual printer, but rather, could be a file that is saved in an application program as a secure file. In this regard, a user may merely select an option in an application program to save a file as a secure file. The software in the client computer packages the file in a secure file format according to the invention and the secure file is saved to a designated location.

The secure file format could also be implemented in facsimile transmissions or e-mail messages. In either of these embodiments, data being transmitted via facsimile or e-mail may be packaged in the secure file format according to the invention, with a device at the receiving end performing the functions of the NEL.

Thus, the secure file format of the present invention could be implemented in virtually any environment where secure transmission of data is involved, and in particular, where data is transmitted via the use of public/private keypairs.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method of generating a new encryption keypair within a device that is connected to a network and which performs secure operations using an existing encryption keypair maintained within the device, comprising the steps of:
receiving a request from another device on the network to provide an encryption key of the existing encryption keypair to the another device;
in response to the request, determining whether an encryption key of the existing encryption keypair within the device is valid; and
in a case where the determining step determines that the encryption key of the existing encryption keypair is invalid, the device automatically performing the steps of:
deleting each key of the existing encryption keypair from the device;
generating a new encryption keypair within the device and storing the new encryption keypair in the device; and
providing a new encryption key corresponding to the requested encryption key of the new encryption keypair to another device.

2. A method according to claim 1, wherein the determining step comprises determining whether each key of the existing encryption keypair is valid.

3. A method according to claim 1, wherein the determining steps comprises performing an integrity check on the requested encryption key.

4. A method according to claim 2, wherein the determining step comprises performing an integrity check on each key of the existing encryption keypair.

5. A method according to claim 1, wherein the device is a printer, the another device is a host computer, and the request is issued by a printer driver in the host computer.

6. A method according to claim 5, wherein the printer driver issues the request for the existing encryption key during installation of the printer driver in the host computer.

7. A method according to claim 5, wherein the printer driver issues the request for the existing encryption key each time a user selects an option for printing a secure print job identifying the device as a destination of the secure print job.

8. A method according to claim 7, wherein the printer driver determines, based on the received encryption key, whether or not to transmit the secure print job to the device.

9. A method according to claim 1, wherein the another device receives the new encryption key from the device, and in response thereto, performs an operation to validate the new encryption key.

10. A method according to claim 9, wherein the validation operation comprises:
issuing a request for the device to print out a key validation page for the new encryption key;
a user inputting into the another device a key validation code printed on the key validation page; and
validating the new encryption key utilizing the input key validation code.

11. A method according to claim 9, wherein the new encryption key is validated utilizing a public key infrastructure.

12. A method according to claim 1, wherein the existing encryption keypair and the new encryption keypair are a public/private keypair of the device.

13. A method according to claim 1, wherein the request includes random data generated within the another device as a source of entropy for encryption key generation.

14. A method according to claim 13, wherein the device generates the new encryption keypair utilizing, as sources of entropy for the new encryption keypair generation, the random data included with the request and random data generated within the device itself.

15. A network device connected to a network which provides encryption functionality to a printer, comprising:
a secure storage medium storing an existing encryption keypair for the network device;
a network interface for receiving and transmitting information via the network;
an entropy collection and storage mechanism for collecting random data within the device that can be used as a source of entropy for encryption key generation and for storing the collected random data;
an encryption key generator for generating encryption keys;

a processor for executing computer-executable process steps; and a memory storing computer-executable process steps to be executed by the processor, the computer-executable process steps comprising:

(a) receiving a request from another device on the network for the network device to provide the another device with an encryption key of the existing encryption keypair stored in the secure storage medium, (b) in response to the request, determining whether the requested encryption key of the existing encryption keypair stored in the secure storage medium is valid, and (c) in a case where the determining step determines that the requested encryption key of the existing encryption keypair is invalid, automatically performing the steps of:

(d) deleting each key of the existing encryption keypair from the secure storage medium, (e) generating a new encryption keypair by the encryption key generator, (f) storing the new encryption keypair in the secure storage medium, and (g) providing a new encryption key corresponding to the requested encryption key of the new encryption keypair to the another device.

16. A network device according to claim 15, wherein the determining step comprises determining whether each key of the existing encryption keypair is valid.

17. A network device according to claim 15, wherein the determining step comprises performing an integrity check on the requested encryption key.

18. A network device according to claim 16, wherein the determining step comprises performing an integrity check on each key of the existing encryption keypair.

19. A network device according to claim 15, the another device is a host computer, and the request is issued by a printer driver in the host computer.

20. A network device according to claim 19, wherein the printer driver issues the request for the existing encryption key during installation of the printer driver in the host computer.

21. A network device according to claim 19, wherein the printer driver issues the request for the existing encryption key each time a user selects an option for printing a secure print job identifying the network device as a destination of the print job.

22. A network device according to claim 21, wherein the printer driver determines, based on the received encryption key, whether or not to transmit the secure print job to the network device.

23. A network device according to claim 15, wherein the another device receives the new encryption key from the network device, and in response thereto, performs an operation to validate the new encryption key.

24. A network device according to claim 23, wherein the validation operation comprises:

issuing a request for the network device to print out a key validation page for the new encryption key;

a user inputting into the another device a key validation code printed on the key validation page; and validating the new encryption key utilizing the input key validation code.

25. A network device according to claim 23, wherein the new encryption key is validated utilizing a public key infrastructure.

26. A network device according to claim 15, wherein the existing encryption keypair and the new encryption keypair are a public/private keypair of the network device.

27. A network device according to claim 15, wherein the request includes random data generated within the another device as a source of entropy for encryption key generation.

28. A network device according to claim 27, wherein the encryption key generator generates the new encryption keypair utilizing, as sources of entropy for the new encryption keypair generation, the random data included with the request and the random data generated by the entropy collection and storage mechanism.

29. A network device according to claim 15, wherein the network device is embedded within the printer.

30. Computer-executable process steps for generating a new encryption keypair within a device that is connected to a network and which performs secure operations using an existing encryption keypair maintained within the device, the executable process steps comprising the steps of:

receiving a request from another device on the network to provide an encryption key of the existing encryption keypair to the another device;

in response to the request, determining whether an encryption key of the existing encryption keypair within the device is valid; and in a case where the determining step determines that the encryption key of the existing encryption keypair is invalid, the device automatically performing the steps of:

deleting each key of the existing encryption keypair from the device;

generating a new encryption keypair within the device and storing the new encryption keypair in the device; and providing a new encryption key corresponding to the requested encryption key of the new encryption keypair to another device.

31. Computer-executable process steps according to claim 30, wherein the determining step comprises determining whether each key of the existing encryption keypair is valid.

32. Computer-executable process steps according to claim 31, wherein the determining step comprises performing an integrity check on each key of the existing encryption keypair.

33. Computer-executable process steps according to claim 30, wherein the determining step comprises performing an integrity check on the requested encryption key.

34. Computer-executable process steps according to claim 30, wherein the device is a printer, the another device is a host computer, and the request is issued by a printer driver in the host computer.

35. Computer-executable process steps according to claim 34, wherein the printer driver issues the request for the existing encryption key during installation of the printer driver in the host computer.

36. Computer-executable process steps according to claim 34, wherein the printer driver issues the request for the existing encryption key each time a user selects an option for printing a secure print job identifying the device as a destination of the secure print job.

37. Computer-executable process steps according to claim 36, wherein the printer driver determines, based on the received encryption key, whether or not to transmit the secure print job to the device.

38. Computer-executable process steps according to claim 30, wherein the another device receives the new encryption key from the device, and in response thereto, performs an operation to validate the new encryption key.

39. Computer-executable process steps according to claim 38, wherein the validation operation comprises:
   issuing a request for the device to print out a key validation page for the new encryption key;
   a user inputting into the another device a key validation code printed on the key validation page; and
   validating the new encryption key utilizing the input key validation code.

40. Computer-executable process steps according to claim 38, wherein the new encryption key is validated utilizing a public key infrastructure.

41. Computer-executable process steps according to claim 30, wherein the existing encryption keypair and the new encryption keypair are a public/private keypair of the device.

42. Computer-executable process steps according to claim 30, wherein the request includes random data generated within the another device as a source of entropy for encryption key generation.

43. Computer-executable process steps according to claim 42, wherein the device generates the new encryption keypair utilizing, as sources of entropy for the new encryption keypair generation, the random data included with the request and random data generated within the device itself.

44. A computer-readable medium which stores computer-executable process steps for generating a new encryption keypair within a device that is connected to a network and which performs secure operations using an existing encryption keypair maintained within the device, the executable process steps comprising the steps of:
   receiving a request from another device on the network to provide an encryption key of the existing encryption keypair to the another device;
   in response to the request, determining whether an encryption key of the existing encryption keypair within the device is valid; and
   in a case where the determining step determines that the encryption key of the existing encryption keypair is invalid, the device automatically performing the steps of:
      deleting each key of the existing encryption keypair from the device;
      generating a new encryption keypair within the device and storing the new encryption keypair in the device; and
      providing a new encryption key corresponding to the requested encryption key of the new encryption keypair to another device.

45. A computer-readable medium according to claim 44, wherein the determining step comprises determining whether each key of the existing encryption keypair is valid.

46. A computer-readable medium according to claim 45, wherein the determining step comprises performing an integrity check on each key of the existing encryption keypair.

47. A computer-readable medium according to claim 44, wherein the determining steps comprises performing an integrity check on the requested encryption key.

48. A computer-readable medium according to claim 44, wherein the device is a printer, the another device is a host computer, and the request is issued by a printer driver in the host computer.

49. A computer-readable medium according to claim 48, wherein the printer driver issues the request for the existing encryption key during installation of the printer driver in the host computer.

50. A computer-readable medium according to claim 48, wherein the printer driver issues the request for the existing encryption key each time a user selects an option for printing a secure print job identifying the device as a destination of the secure print job.

51. A computer-readable medium according to claim 50, wherein the printer driver determines, based on the received encryption key, whether or not to transmit the secure print job to the device.

52. A computer-readable medium according to claim 44, wherein the another device receives the new encryption key from the device, and in response thereto, performs an operation to validate the new encryption key.

53. A computer-readable medium according to claim 52, wherein the validation operation comprises:
   issuing a request for the device to print out a key validation page for the new encryption key;
   a user inputting into the another device a key validation code printed on the key validation page; and
   validating the new encryption key utilizing the input key validation code.

54. A computer-readable medium according to claim 52, wherein the new encryption key is validated utilizing a public key infrastructure.

55. A computer-readable medium according to claim 44, wherein the existing encryption keypair and the new encryption keypair are a public/private keypair of the device.

56. A computer-readable medium according to claim 44, wherein the request includes random data generated within the another device as a source of entropy for encryption key generation.

57. A computer-readable medium according to claim 56, wherein the device generates the new encryption keypair utilizing, as sources of entropy for the new encryption keypair generation, the random data included with the request and random data generated within the device itself.

58. A method of printing a secure print job, comprising the steps of:
   a host apparatus submitting a request to a network device for the network device to provide the host apparatus with an existing encryption key of a printer;
   the network device, in response to receiving the request, determining whether the requested encryption key of the existing encryption keypair of the printer is valid;
   in a case where the requested existing encryption key is determined to be invalid, the network device automatically performing the steps of:
      deleting the existing encryption keypair from the network device;
      generating a new encryption keypair within the network device;
      storing the new encryption keypair in the network device; and
      transmitting a new encryption key corresponding to the requested encryption key of the new encryption keypair to the host apparatus;
   the host apparatus receiving the new encryption key from the network device, and in response thereto, performing an operation to validate the new encryption key;
   the host apparatus generating an encrypted print job utilizing the new encryption key and transmitting the encrypted print job to the network device; and
   the network device utilizing a corresponding encryption key of the new encryption keypair to decrypt the encrypted print job, and processing the decrypted print job for printout by the printer.

59. A method according to claim 58, wherein the operation to validate the new encryption key comprises the steps of:
the host apparatus issuing a request to the network device for print out of an encryption key validation page;
the network device causing printout of the encryption key validation page;
a user inputting a key validation code printed on the key validation page into the host apparatus; and
the host apparatus validating the new encryption key utilizing the input key validation code.

60. A method according to claim 58, wherein the request issued by the host apparatus for the network device to provide the host apparatus with an existing encryption key includes random data generated within the host apparatus as a source of entropy for encryption key generation.

61. A method according to claim 60, wherein the network device generates the new encryption keypair utilizing, as sources of entropy for the keypair generation, the random data included with the request and random data generated within the network device itself.

62. A method according to claim 58, wherein the request issued by the host apparatus for the existing encryption key is initiated by a user selecting a secure printing option in the host apparatus.

63. A method according to claim 58, wherein the network device is connected externally to the printer.

64. A method according to claim 58, wherein the network device is embedded within the printer.

65. Computer-executable process steps for printing a secure print job, comprising the steps of:
a host apparatus submitting a request to a network device for the network device to provide the host apparatus with an existing encryption key of a printer;
the network device, in response to receiving the request, determining whether the requested encryption key of the existing encryption keypair of the printer is valid;
in a case where the requested existing encryption key is determined to be invalid, the network device automatically performing the steps of:
deleting the existing encryption keypair from the network device;
generating a new encryption keypair within the network device;
storing the new encryption keypair in the network device; and
transmitting a new encryption key corresponding to the requested encryption key of the new encryption keypair to the host apparatus;
the host apparatus receiving the new encryption key from the network device, and in response thereto, performing an operation to validate the new encryption key;
the host apparatus generating an encrypted print job utilizing the new encryption key and transmitting the encrypted print job to the network device; and
the network device utilizing a corresponding encryption key of the new encryption keypair to decrypt the encrypted print job, and processing the decrypted print job for printout by the printer.

66. Computer-executable process steps according to claim 65, wherein the operation to validate the new encryption key comprises the steps of:
the host apparatus issuing a request to the network device for print out of an encryption key validation page;
the network device causing printout of the encryption key validation page;
a user inputting a key validation code printed on the key validation page into the host apparatus; and
the host apparatus validating the new encryption key utilizing the input key validation code.

67. Computer-executable process steps according to claim 65, wherein the request issued by the host apparatus for the network device to provide the host apparatus with an existing encryption key includes random data generated within the host apparatus as a source of entropy for encryption key generation.

68. Computer-executable process steps according to claim 67, wherein the network device generates the new encryption keypair utilizing, as sources of entropy for the keypair generation, the random data included with the request and random data generated within the network device itself.

69. Computer-executable process steps according to claim 65, wherein the request issued by the host apparatus for the existing encryption key is initiated by a user selecting a secure printing option in the host apparatus.

70. Computer-executable process steps according to claim 65, wherein the network device is connected externally to the printer.

71. Computer-executable process steps according to claim 65, wherein the network device is embedded within the printer.

72. A computer-readable medium which stores computer-executable process steps for printing a secure print job, the computer-executable process steps comprising the steps of:
a host apparatus submitting a request to a network device for the network device to provide the host apparatus with an existing encryption key of a printer;
the network device, in response to receiving the request, determining whether the requested encryption key of the existing encryption keypair of the printer is valid;
in a case where the requested existing encryption key is determined to be invalid, the network device automatically performing the steps of:
deleting the existing encryption keypair from the network device;
generating a new encryption keypair within the network device;
storing the new encryption keypair in the network device; and
transmitting a new encryption key corresponding to the requested encryption key of the new encryption keypair to the host apparatus;
the host apparatus receiving the new encryption key from the network device, and in response thereto, performing an operation to validate the new encryption key;
the host apparatus generating an encrypted print job utilizing the new encryption key and transmitting the encrypted print job to the network device; and
the network device utilizing a corresponding encryption key of the new encryption keypair to decrypt the encrypted print job, and processing the decrypted print job for printout by the printer.

73. A computer-readable medium according to claim 72, wherein the operation to validate the new encryption key comprises the steps of:
the host apparatus issuing a request to the network device for print out of an encryption key validation page;
the network device causing printout of the encryption key validation page;
a user inputting a key validation code printed on the key validation page into the host apparatus; and
the host apparatus validating the new encryption key utilizing the input key validation code.

74. A computer-readable medium according to claim 72, wherein the request issued by the host apparatus for the network device to provide the host apparatus with an existing encryption key includes random data generated within the host apparatus as a source of entropy for encryption key generation.

75. A computer-readable medium according to claim 74, wherein the network device generates the new encryption keypair utilizing, as sources of entropy for the keypair generation, the random data included with the request and random data generated within the network device itself.

76. A computer-readable medium according to claim 72, wherein the request issued by the host apparatus for the existing encryption key is initiated by a user selecting a secure printing option in the host apparatus.

77. A computer-readable medium according to claim 72, wherein the network device is connected externally to the printer.

78. A computer-readable medium according to claim 72, wherein the network device is embedded within the printer.

* * * * *

UNITED STATES PATENT AND TRADEMARK OFFICE
CERTIFICATE OF CORRECTION

PATENT NO. : 7,111,322 B2
APPLICATION NO. : 10/309896
DATED : September 19, 2006
INVENTOR(S) : Slick et al.

It is certified that error appears in the above-identified patent and that said Letters Patent is hereby corrected as shown below:

COLUMN 1:
Line 13, "a" should be deleted.

COLUMN 5:
line 25, "such," should read -- such --.

COLUMN 7:
Line 29, "perform" should read -- perform --.

COLUMN 8:
Line 41, "proformed." should read -- performed. --.

COLUMN 12:
Line 1, "may the" should read -- may be the --

COLUMN 22:
Line 6, "to another" should read -- to the another --; and
Line 11, "steps" should read -- step --.

COLUMN 24:
Line 37, Q: "to another" should read -- to the another --.

COLUMN 25:
Line 49, "to another" should read -- to the another --; and
Line 58, "steps" should read -- step --.

UNITED STATES PATENT AND TRADEMARK OFFICE
CERTIFICATE OF CORRECTION

PATENT NO. : 7,111,322 B2
APPLICATION NO. : 10/309896
DATED : September 19, 2006
INVENTOR(S) : Slick et al.

It is certified that error appears in the above-identified patent and that said Letters Patent is hereby corrected as shown below:

COLUMN 27:
Line 5, "print out" should read -- printout --; and
Line 65, "print out" should read -- printout --.

COLUMN 28:
Line 61, "print out" should read -- printout --.

Signed and Sealed this

Eleventh Day of March, 2008

JON W. DUDAS
*Director of the United States Patent and Trademark Office*